US012594725B2

(12) United States Patent
Kosmal et al.

(10) Patent No.: US 12,594,725 B2
(45) Date of Patent: Apr. 7, 2026

(54) AUTONOMOUS FABRICATION OF MECHATRONIC SYSTEMS

(71) Applicant: VIRGINIA TECH INTELLECTUAL PROPERTIES, INC., Blacksburg, VA (US)

(72) Inventors: Tadeusz Kosmal, Falls Church, VA (US); Kieran Beaumont, Reston, VA (US); Eric Link, Vienna, VA (US); Dalton Phillips, Columbia, MO (US); Conner Pulling, Norfolk, VA (US); James Lowe, Reston, VA (US); Christopher Williams, Blacksburg, VA (US); Joseph Kubalak, College, PA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 41 days.

(21) Appl. No.: 18/298,116

(22) Filed: Apr. 10, 2023

(65) Prior Publication Data

US 2023/0398745 A1 Dec. 14, 2023

Related U.S. Application Data

(60) Provisional application No. 63/366,153, filed on Jun. 10, 2022.

(51) Int. Cl.
*B29C 64/379* (2017.01)
*B25J 9/16* (2006.01)
(Continued)

(52) U.S. Cl.
CPC .......... *B29C 64/379* (2017.08); *B25J 9/1664* (2013.01); *B25J 9/1687* (2013.01); *B29C 64/209* (2017.08);
(Continued)

(58) Field of Classification Search
CPC .................................................... B29C 64/194
See application file for complete search history.

(56) References Cited

U.S. PATENT DOCUMENTS

2005/0194401 A1* 9/2005 Khoshnevis ............ B28B 1/001
222/100

FOREIGN PATENT DOCUMENTS

WO WO2005070657 * 8/2005

OTHER PUBLICATIONS

A. J. Lopes, I. H. Lee, E. MacDonald, R. Quintana, and R. Wicker, "Laser curing of silver-based conductive inks for in situ 3D structural electronics fabrication in stereolithography," Journal of Materials Processing Technology, vol. 214, No. 9. Elsevier BV, pp. 1935-1945, Sep. 2014. doi: 10.1016/j.jmatprotec.2014.04.009.

(Continued)

*Primary Examiner* — Edmund H Lee
(74) *Attorney, Agent, or Firm* — Perilla Knox & Hildebrandt LLP; Jonathan A. Paulis

(57) ABSTRACT

An autonomous fabrication method and system are described. A multi-axis robotic arm having at least one end effector is provided, where the at least one end effector comprises an additive manufacturing (AM) toolhead and a component gripping mechanism. The multi-axis robotic arm is directed to fabricate a first portion of an object in a workspace using the AM toolhead, select a prefabricated part using the component gripping mechanism, place the prefabricated part in a predetermined location of the object, and fabricate a second portion of the object in the workspace using the AM toolhead. The object may be one of an unmanned aerial vehicle and an unmanned ground-based vehicle.

18 Claims, 16 Drawing Sheets

(51) Int. Cl.
    *B29C 64/209*     (2017.01)
    *B33Y 10/00*     (2015.01)
    *B33Y 30/00*     (2015.01)
    *B33Y 80/00*     (2015.01)

(52) U.S. Cl.
    CPC .............. *B33Y 10/00* (2014.12); *B33Y 30/00* (2014.12); *B33Y 80/00* (2014.12)

(56) References Cited

OTHER PUBLICATIONS

A. Joe Lopes, E. MacDonald, and R. B. Wicker, "Integrating stereolithography and direct print technologies for 3D structural electronics fabrication," Rapid Prototyping Journal, vol. 18, No. 2. Emerald, pp. 129-143, Mar. 2, 2012. doi: 10.1108/13552541211212113.

A. Kataria and D. W. Rosen, "Building around inserts: methods for fabricating complex devices in stereolithography," Rapid Prototyping Journal, vol. 7, No. 5. Emerald, pp. 253-262, Dec. 1, 2001. doi: 10.1108/13552540110410459.

Coronel Jr, Jose. (2015). Multi3D system: Advanced manufacturing through the implementation of material handling robotics.

D. J. Roach, C. M. Hamel, C. K. Dunn, M. V. Johnson, X. Kuang, and H. J. Qi, "The M4 3D printer: A multi-material multi-method additive manufacturing platform for future 3D printed structures," Additive Manufacturing, vol. 29, p. 100819, 2019.

E. McDonald and R. Wicker, "Multiprocess 3D printing for increasing component functionality,"https://www.science.org/doi/10.1126/science.aaf2093, 2016.

G. W. Wagner et al., "Design and Development of a Multi-Tool Additive Manufacturing System." University of Texas at Austin, 2017. doi: 10.26153/16922.

H. Agrawal, A. Singhal, and K. Hans Raj, "3D Printed Quadcopter," https://link.springer.com/chapter/10.1007/978-981-15-8025-3_48, 2021.

H. Peng, F. Guimbretière, J. McCann, and S. Hudson, "A 3D printer for interactive electromagnetic devices," Proceedings of the 29th Annual Symposium on User Interface Software and Technology, 2016.

J. G. Cham, B. L. Pruitt, M. R. Cutkosky, M. Binnard, L. E. Weiss, and G. Neplotnik, "Layered Manufacturing With Embedded Components: Process Planning Considerations," vol. 4: 4th Design for Manufacturing Conference. American Society of Mechanical Engineers, Sep. 12, 1999. doi: 10.1115/detc99/dfm-8910.

J.Bright, R. Suryaprakash, S. Akash, and A. Giridharan, "Optimization of quadcopter frame using generative design and comparison with Dji F450 drone frame,"https://iopscience.iop.org/article/10.1088/1757-899X/1012/1/012019/meta, 2021.

M. Nisser, C. C. Liao, Y. Chai, A. Adhikari, S. Hodges, and S. Mueller, "LaserFactory: A Laser Cutter-based electromechanical assembly and fabrication platform to make Functional Devices & Robots," Proceedings of the 2021 CHI Conference on Human Factors in Computing Systems, 2021.

N. A. Meisel, A. M. Elliott, and C. B. Williams, "A procedure for creating actuated joints via embedding shape memory alloys in PolyJet 3D printing," Journal of Intelligent Material Systems and Structures, vol. 26, No. 12. SAGE Publications, pp. 1498-1512, Jul. 24, 2014. doi: 10.1177/1045389x14544144.

S. Keating and N. Oxman, "Compound fabrication: A multi-functional robotic platform for digital design and fabrication," https://www.sciencedirect.com/science/article/pii/S0736584513000409, 2013.

S. M. Lavelle, "Rapidly-exploring random trees : a new tool for path planning," The annual research report, 1998.

Y. J. Yoon, O. G. Almeida, A. V. Shembekar, and S. K. Gupta, "A Robotic Cell for Embedding Prefabricated Components in Extrusion-Based Additive Manufacturing," vol. 1: Additive Manufacturing; Advanced Materials Manufacturing; Biomanufacturing; Life Cycle Engineering; Manufacturing Equipment and Automation. American Society of Mechanical Engineers, Sep. 3, 2020. doi: 10.1115/msec2020-8494.

* cited by examiner

Flat Surfaces for
Embedding

600

600

AUTONOMOUS FABRICATION OF MECHATRONIC SYSTEMS

CROSS-REFERENCE TO RELATED APPLICATION

This application claims the benefit of and priority to U.S. Provisional Patent Application No. 63/366,153 entitled "AUTONOMOUS ROBOTIC AERIAL VEHICLE FABRICATOR," filed Jun. 10, 2022, the contents of which being incorporated by reference in their entirety herein.

GOVERNMENT LICENSE RIGHTS

This invention was made with government support under Grant No. 426730 awarded by the National Aeronautics and Space Administration (NASA). The government has certain rights in the invention.

BACKGROUND

Additive manufacturing (AM) includes layer-wise fabrication of objects permitting not only the realization of complex geometries, but also providing access to an interior volume of a fabricated object throughout a build process. Additive manufacturing has thus been employed to directly fabricate multi-functional parts where foreign, non-printable components (e.g., integrated circuits, batteries, motors, antenna, etc.) are embedded into a part. Generally, this is accomplished by pausing the build, placing the component into a pre-designed cavity manually using a human, forming electrical connections by the human, and then resuming the print to fully embed the object. While early research in fabricating multi-functional components was limited to manual embedding steps, researchers have recently looked to hybrid AM systems with Pick and Place (PnP) assembly systems to automatically insert non-printable components and/or combinations of additive manufacturing processes within a fabrication space.

BRIEF SUMMARY OF THE INVENTION

Various embodiments are disclosed for autonomous fabrication of unmanned land systems, unmanned aerial systems, and other mechatronic systems. In a first aspect, a method is described that includes providing a multi-axis robotic arm having at least one end effector, wherein the at least one end effector comprises an additive manufacturing (AM) toolhead and a component gripping mechanism; fabricating, by the multi-axis robotic arm, a first portion of an object in a workspace using the AM toolhead; selecting, by the multi-axis robotic arm, a prefabricated part using the component gripping mechanism and placing, by the multi-axis robotic arm, the prefabricated part in a predetermined location of the object; and fabricating, by the multi-axis robotic arm, a second portion of the object in the workspace using the AM toolhead.

In some aspects, the object is an autonomously mobile object; the prefabricated part is a plurality of prefabricated parts having a common set of design features, at least two of the plurality of prefabricated parts selected from a group consisting of: a battery; a microcontroller; an imaging device; a motor; a propeller; a wheel; a global positioning system (GPS) module; and a networking module; and the autonomous fabrication method further comprises, after completion of fabrication of the autonomously mobile object, instructing the autonomously mobile object to navigate a predetermined path directly from the workspace.

In further aspects, the method further includes further comprising directing, by a controller, an actuator to apply force laterally to the object as fabricated prior to instructing the autonomously mobile object to navigate the predetermined path. The prefabricated part as selected may be one of a plurality of prefabricated parts positioned separate from and proximate to the workspace.

The at least one end effector may be a single end effector having the AM toolhead and the component gripping mechanism, the AM toolhead and the component gripping mechanism being positioned orthogonal to one another; and the autonomous fabrication method may further include directing, by a controller, the multi-axis robotic arm to transition between the AM toolhead and the component gripping mechanism through a rotation of the single end effector.

The prefabricated part as placed may be a first electronic device; the autonomous fabrication method may further include selecting, by the multi-axis robotic arm, a second electronic device using the component gripping mechanism; forming, by the multi-axis robotic arm, a wired connection between the first electronic device and the second electronic device; and placing, by the multi-axis robotic arm, the second electronic device in a predetermined location of the object such that the wired connection is maintained.

The forming, by the multi-axis robotic arm, the wired connection between the first electronic device and the second electronic device may include orienting, by the multi-axis robotic arm, the second electronic device proximate to a first connector of the first electronic device, the second electronic device comprising a second connector, the first connector being coupled to a wire; positioning, by the multi-axis robotic arm, the second prefabricated part towards proximate to a first connector of the first electronic device such that the first connector and the second connector are coupled to one another through the wire; and repositioning, by the multi-axis robotic arm, the second electronic device in the predetermined location of the object such that the wired connection is maintained.

In some aspects, the method may further include providing a host client, a first controller adapted to control the multi-axis robotic arm, a second controller adapted to control an actuator configured to apply lateral force to the object as fabricated, and a third controller adapted to control the AM toolhead and the component gripping mechanism of the end effector; and subscribing, by the first controller, the second controller, and the third controller, with the host client through an instruction messaging service, wherein corresponding instructions accessed by the host client are pulled from the instruction messaging service by the first controller, the second controller, and the third controller. The multi-axis robotic arm may have six degrees-of-freedom (6-DoF) in some aspects. The object may be one of an unmanned aerial vehicle, an unmanned ground-based vehicle, and an unmanned water-based vehicle.

In a second aspect, an autonomous fabrication system is described, comprising: a multi-axis robotic arm having at least one end effector, wherein the at least one end effector comprises an additive manufacturing (AM) toolhead and a component gripping mechanism; processing circuitry configured to: direct the multi-axis robotic arm to fabricate a first portion of an object in a workspace using the AM toolhead; direct the multi-axis robotic arm to select a prefabricated part using the component gripping mechanism and place the prefabricated part in a predetermined location of the object; and direct the multi-axis robotic arm to fabricate a second portion of the object in the workspace using the AM toolhead.

In some aspects, the object is an autonomously mobile object; the prefabricated part is a plurality of prefabricated parts having a common set of design features, at least two of the plurality of prefabricated parts selected from a group consisting of: a battery; a microcontroller; an imaging device; a motor; a propeller; a wheel; a global positioning system module; and a networking module; and the processing circuitry is further configured to, after completion of fabrication of the autonomously mobile object, instruct the autonomously mobile object to navigate a predetermined path directly from the workspace. The processing circuitry may be further configured to engage an actuator to apply force laterally to the object as fabricated prior to the autonomously mobile object navigating the predetermined path. The prefabricated part as selected may be one of a plurality of prefabricated parts positioned separate from and proximate to the workspace.

In further aspects, the at least one end effector is a single end effector having the AM toolhead and the component gripping mechanism, the AM toolhead and the component gripping mechanism being positioned orthogonal to one another; and the processing circuitry is further configured to direct the multi-axis robotic arm to transition between the AM toolhead and the component gripping mechanism through a rotation of the single end effector.

In some aspects, the prefabricated part as placed is a first electronic device; the processing circuitry is further configured to: instruct the multi-axis robotic arm to select a second electronic device using the component gripping mechanism; instruct the multi-axis robotic arm to form a wired connection between the first electronic device and the second electronic device; and instruct the multi-axis robotic arm to place the second electronic device in a predetermined location of the object such that the wired connection is maintained.

The wired connection between the first electronic device and the second electronic device may be formed by: orienting, by the multi-axis robotic arm, the second electronic device proximate to a first connector of the first electronic device, the second electronic device comprising a second connector, the first connector being coupled to a wire; and positioning, by the multi-axis robotic arm, the second prefabricated part towards proximate to a first connector of the first electronic device such that the first connector and the second connector are coupled to one another through the wire; and repositioning, by the multi-axis robotic arm, the second electronic device in the predetermined location of the object such that the wired connection is maintained.

In some aspects, the processing circuitry comprises a host client, a first controller adapted to control the multi-axis robotic arm, a second controller adapted to control an actuator configured to apply lateral force to the object as fabricated, and a third controller adapted to control the AM toolhead and the component gripping mechanism of the end effector; and the first controller, the second controller, and the third controller are configured to subscribe to the host client through an instruction messaging service, wherein corresponding instructions accessed by the host client are pulled from the instruction messaging service by the first controller, the second controller, and the third controller. The multi-axis robotic arm may have six degrees-of-freedom (6-DoF) in some aspects. The object may be one of an unmanned aerial vehicle, an unmanned ground-based vehicle, and an unmanned water-based vehicle.

In some aspects, to reduce need for high precision robotic alignment during pick-and-place operations, the component gripping mechanism of the end effector includes an electromagnet and a shroud. The geometry of the shroud matches with a common PnP interface located on each prefabricated part. For instance, the shroud may include V-shaped or U-shaped notches on opposing sides that engage corresponding projections or like interfaces that permits the component gripping mechanism to pick up any prefabricated part, no matter its form factor, assuming the prefabricated part includes the common PnP interface. The common PnP interface may be integral with the prefabricated part or, alternatively, a carrier frame may be coupled to the prefabricated part to enable a coupling between the prefabricated part and the shroud of the component gripping mechanism. The common PnP interface may include beveled self-locating features to allow a positional inaccuracy of up to two mm in each direction in some implementations.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to the autonomous fabrication of mechatronic systems. More specifically, according to various embodiments, an autonomous fabrication system described that is capable of autonomous and flexible fabrication of complete, full-scale, functional mechatronic systems, such as an unmanned ground-based system (e.g., an autonomous rover), an unmanned aerial vehicle (e.g., a drone capable of flight), and an unmanned water-based vehicle (e.g., a submersible capable of underwater motion). First, the autonomous fabrication system has additive manufacturing (AM) capabilities that enable flexible fabrication of customizable component enclosures. Second, the autonomous fabrication system has pick-and-place capabilities that locate, place, and interconnect various components, such as those not being capable of whole fabrication via additive manufacturing.

In addition, the autonomous fabrication system may be cable of managing wiring and forming wired connections between various components within a fabricated object. In various embodiments, the autonomous fabrication system features a multi-axis robotic arm (e.g., a 6-DoF robotic arm) with a hybrid end effector capable of both additive manufacturing and pick-and-place operations. In some embodiments, a modular electronics infrastructure is provided that enables facile, error-free robotic wiring of large-gauge copper wire between the embedded mechatronic components. The control system, digital workflow for creating assembly instructions, hybrid AM/PnP toolhead design, and autonomous part tending mechanism are detailed. The autonomous fabrication system as described herein has been shown to autonomously fabricate a functional quadrotor drone such that the drone is able to directly fly off of a build plate and digitally record a construction of a subsequently fabricated drone.

Figure 1A:
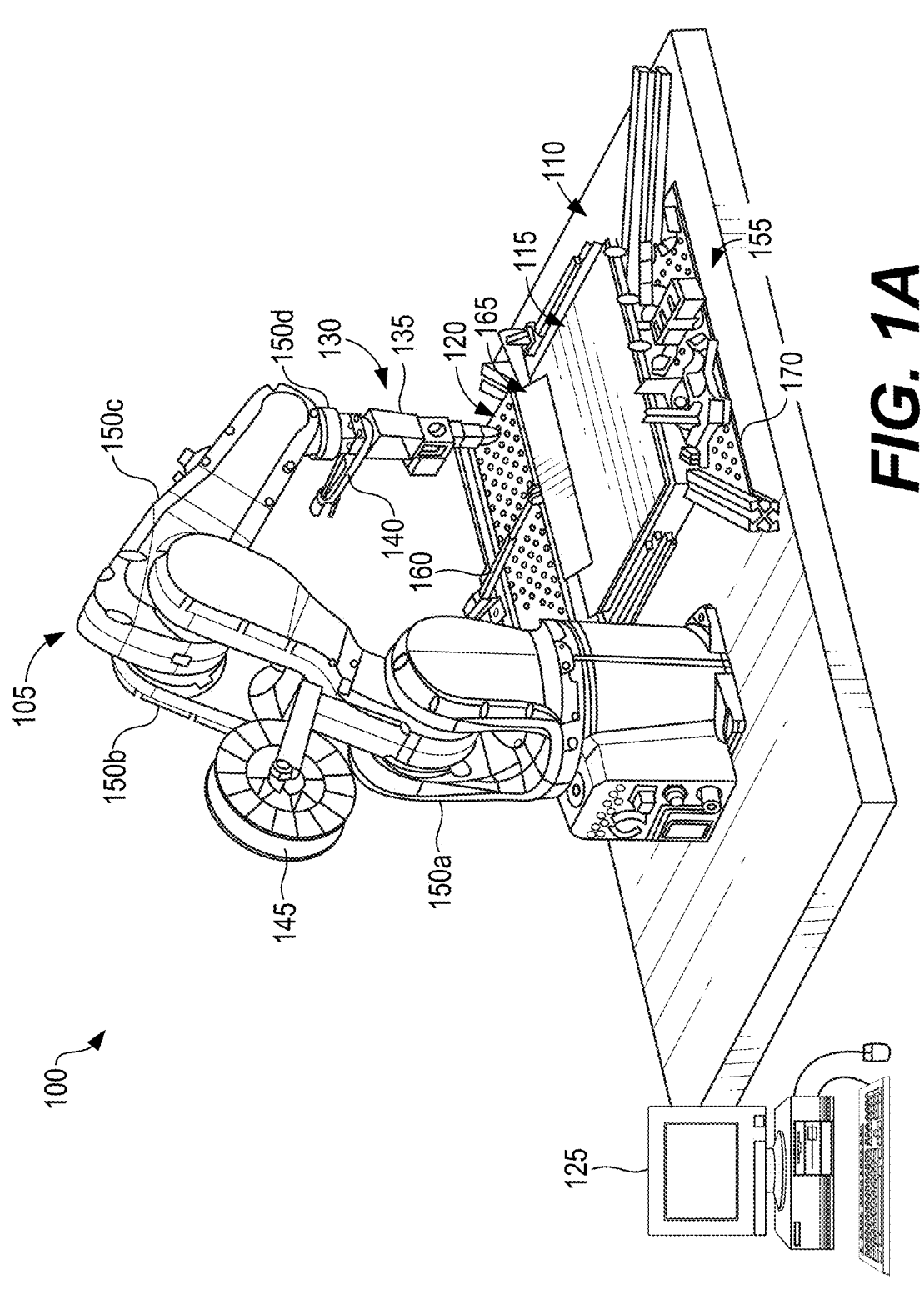
FIGS. 1A and 1B show various examples of an autonomous fabrication system having a robotic workcell in accordance with various embodiments of the present disclosure.
Figure 1B:
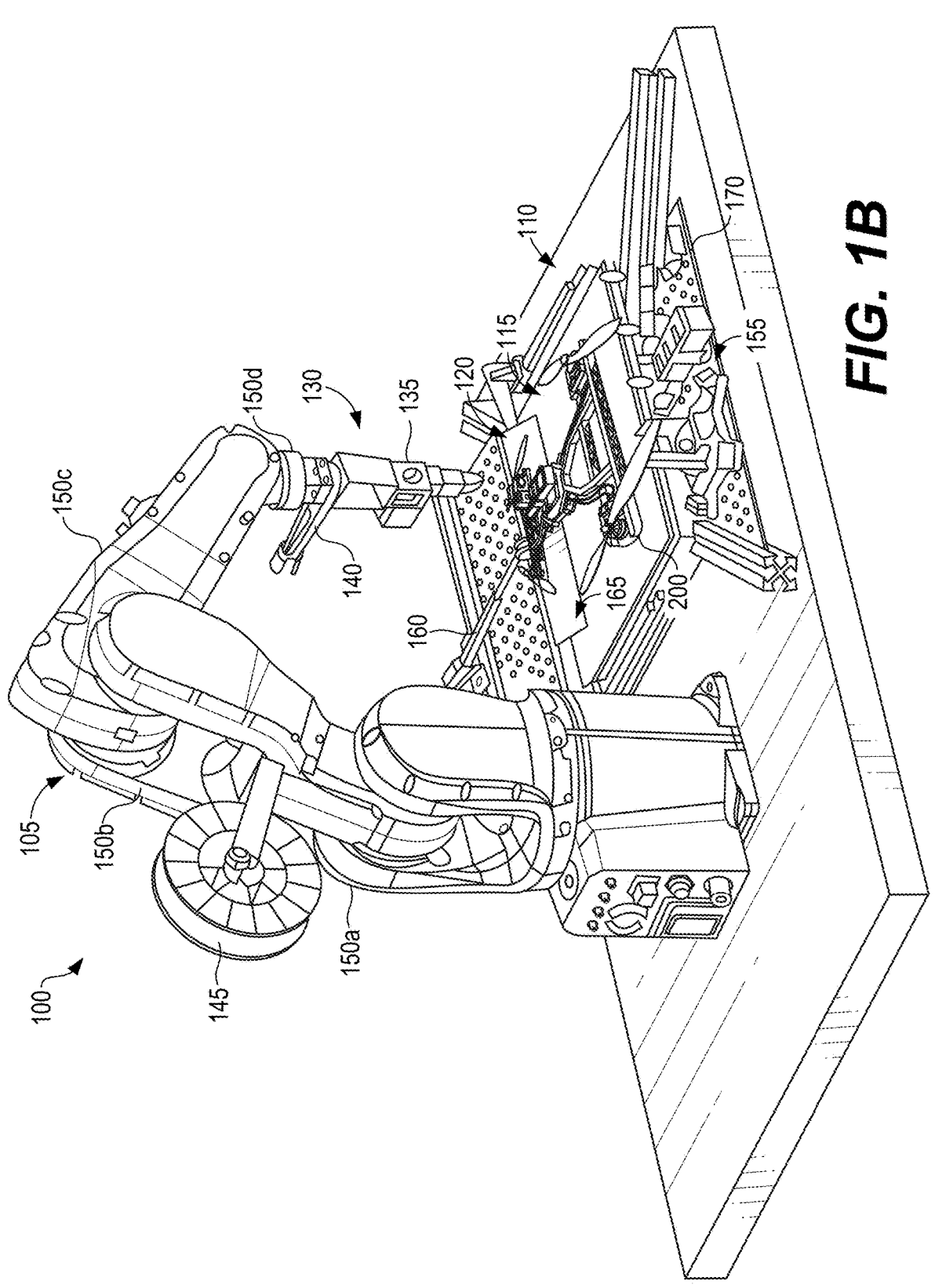

Turning now to FIGS. 1A and 1, non-limiting examples of an autonomous fabrication system 100 are shown according to various embodiments. FIG. 1B shows an example of an object 200 fabricated by the autonomous fabrication system 100, whereas the object 200 is omitted from FIG. 1A for explanatory purposes. Referring to FIGS. 1A and 1B collectively, in some embodiments, the autonomous fabrication system 100 includes a robotic arm 105, a build surface 110, a build area 115, a lateral movement device 120, and a control system 125, among other components to be described.

The robotic arm 105 may include an end effector 130 or like device capable of performing one or more of additive manufacturing functions, pick-and-place functions, and so forth. While described in the singular, in some implementations, multiple end effectors 130 may be employed with the robotic arm 105. In some embodiments, however, the end effector 130 may include a single end effector 130 having an additive manufacturing (AM) toolhead 135 and a component gripping mechanism 140.

The AM toolhead 135 may be configured to deposit a material in a layer by layer fashion in order to fabricate all or a portion of an object. As such, in some embodiments, the AM toolhead 135 may include a fused filament fabrication (FFF)-type of AM toolhead 135. To this end, the autonomous fabrication system 100 may include a filament spool 145 having filament or other material contained thereon that is selectively fed to the AM toolhead 135 during fabrication of an object. While various embodiments include an AM toolhead 135 for additive manufacturing, it is understood that in other embodiments, other toolheads may be employed, such as laser cutters for laser fabrication and so forth.

The component gripping mechanism 140 may include electric grippers, pneumatic grippers, suction cups or suction devices, magnetic grippers, mechanical grippers, and so forth. The component gripping mechanism 140 may thus be configured to pick-and-place items. For example, the component gripping mechanism 140 may be configured to pick a prefabricated item and place the prefabricated item in a determined position of the build area 115 which may include, in some scenarios, a position on a partially or fully fabricated object 200.

Further, the robotic arm 105 may include a multi-axis robotic arm 105 in some implementations. To this end, the robotic arm 105 may thus include multiple segments 150a . . . 150d pivotably connected to one another where each segment 150 may be driven using motors, pneumatics, and the like. Each segment 150 may be selectively controlled and positioned by the control system 125 in a three-dimensional space (e.g., using Denavit-Hartenberg parameters) to control a position of the end effector 130 in the three-dimensional space, for example.

The control system 125 may include processing circuitry configured to control the various components of the autonomous fabrication system 100 including, but not limited to, the robotic arm 105 and/or the segments 150 thereof, the end effector 135 and components thereof, and so forth. The control system 125 may thus be referred to as a controller in some scenarios. The control system 125 may be formed of circuitry, such as application-specific integrated circuits (ASIC) or like circuitry, or may be formed by a computing device, as shown in FIG. 1A. The computing device may include one having at least one hardware processor, memory, and a data bus, among other components. Control of the various components of the autonomous fabrication system 100 may be accomplished via program instructions (e.g., software) stored in memory and executable by the at least one hardware processor, as may be appreciated.

In some implementations, prefabricated parts 155 may be placed on or near the build surface 110 such that the prefabricated parts 155 are within reach of the robotic arm 105. The prefabricated parts 155 may include a common set of design features. For instance, each of the prefabricated parts 155 may be positioned in a same or similar type of housing that is retrievable by the end effector 130 or component thereof. In the examples of FIGS. 1A and 1i, the prefabricated parts 155 are positioned laterally or to a side of the build area 115. The prefabricated part 155 may be a prefabricated item for implementation in a mechatronic system, such as a drone or a UAV. For instance, the prefabricated part 155 may be one or more of a multitude of prefabricated parts including, but not limited to, a battery, a microcontroller, an imaging device (e.g., a camera), a motor, a propeller, a wheel, a global positioning system module, and a networking module. The prefabricated parts 155 may be positioned separate from and proximate to the workspace or build area 115.

In one example operation, the control system 125 may direct the robotic arm 105 to fabricate a first portion of an object 200 in a workspace using the AM toolhead 135. The first portion of the object 200, for example, may include a base of a drone. Thereafter, the control system 125 may direct the multi-axis robotic arm 105 to select a prefabricated part 155 using the component gripping mechanism 140, and place the prefabricated part 155 in a predetermined location of the object 200 during fabrication. Finally, the control system 125 may direct the robotic arm 105 to fabricate a second portion of the object in the workspace using the AM toolhead 135. For instance, the second portion of the object 200 may seal, form a barrier over, or otherwise couple the prefabricated part 155 to the object 200.

As noted above, the prefabricated part 155 may be one or more of a multitude of prefabricated parts 155 including, but not limited to, a battery, a microcontroller, an imaging device (e.g., a camera), a motor, a propeller, a wheel, a global positioning system module, and a networking module. As such, in some implementations, the object 200 as fabricated is an autonomously mobile object 200, such as an unmanned land vehicle or an unmanned aerial vehicle (FIG. 1). The control system 125 may be further configured to, after completion of fabrication of the autonomously mobile object 200, instruct the autonomously mobile object 200 to navigate a predetermined path directly from the workspace or build area 115.

The build surface 110 may include a heated build surface 110 in some implementations. Further, in some embodiments, the fabricated object 200 may not be easily removable from the build surface 110 due to adhesion based on a material of the build surface 110, a filament used by the AM toolhead 135, and so forth. As such, the control system 125 may direct the lateral movement device 120 to apply a lateral force to the object 200 to remove a seal or any friction between the build surface 110 and the fabricated object 200. The lateral movement device 120 may thus include an actuator 160 movably coupled to a scraper 165. Movement of the actuator 160 may cause the scraper 165, positioned at an angle (e.g., 10 to 85 degrees) relative to the fabricated object 200, to apply force at least laterally or underneath the fabricated object to remove the seal or the friction therebetween. As such, the control system 125 may engage the actuator 160 to apply force laterally to the object as fabricated prior to an autonomously mobile object navigating a predetermined path.

In some implementations, the robotic arm 105 is a 6-DoF robotic arm having kinematic flexibility to perform both hybridized material extrusion (MEX) fabrication and pick-and-place operations. The robotic arm 105 may further rapidly reconfigure or transition between each tools (e.g., between the AM toolhead 135 and the component gripping mechanism 140). A heated build plate 110, the lateral movement device 120, and a parts tray 170 having prefabricated parts 155 stored thereon may be incorporated to assist with fabrication.

Figure 2:
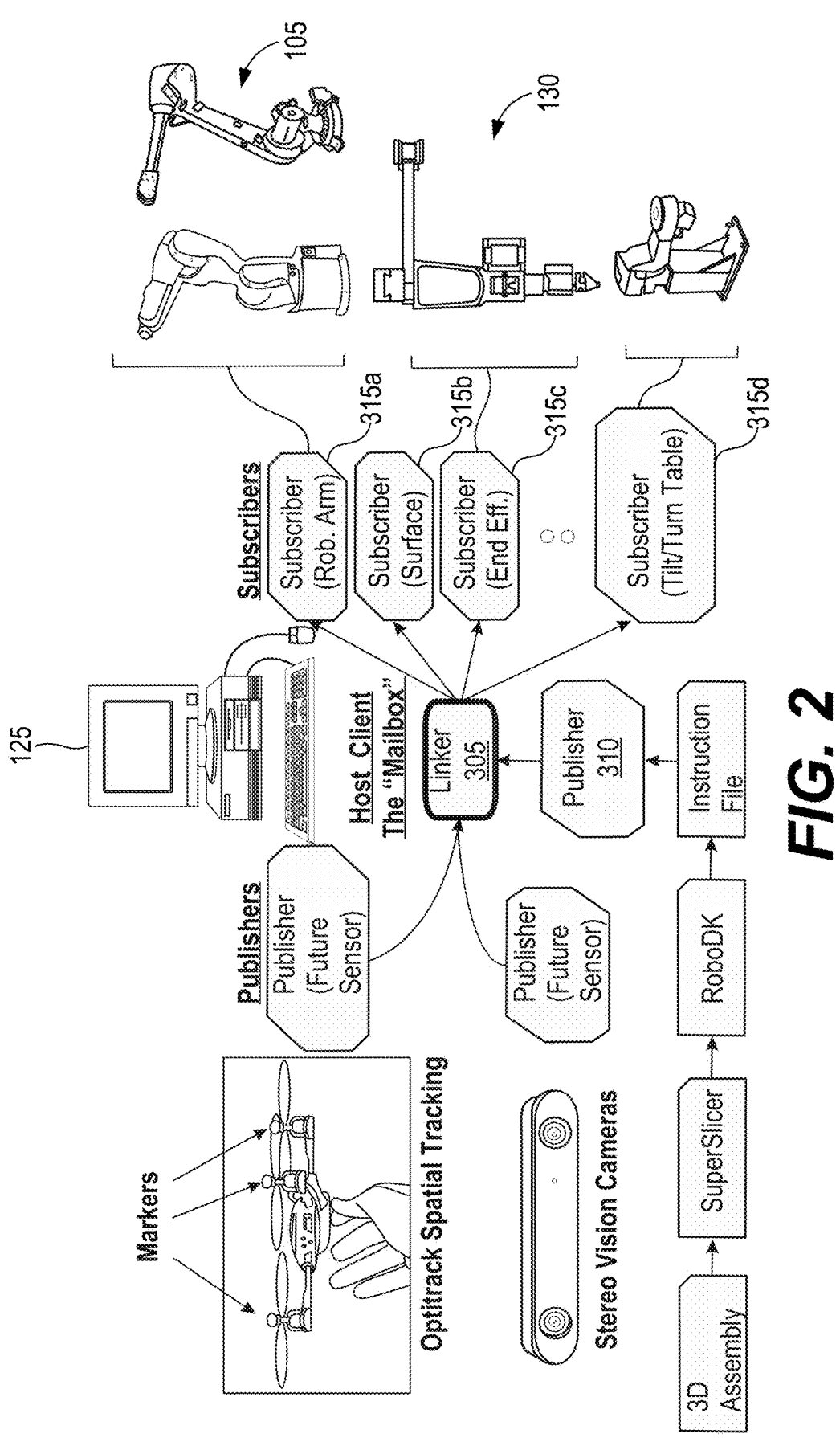
FIG. 2 is a schematic diagram of publisher-subscriber control framework that may be implemented in the autonomous fabrication system in accordance with various embodiments of the present disclosure.

Moving along to FIG. 2, a schematic diagram is shown of a publisher-subscriber framework that may be implemented in the autonomous fabrication system 100. In some embodiments, the control system 125 may execute a self-developed publisher-subscriber framework. The control system 125 may include a host client, which may be a host computing device for example, also referred to as a linker 305. The linker 305 is then connected to peripheral devices, such as the robot arm 105, toolheads, and build surface 110, via a communication connection (e.g., serial connection, ethernet connection, and so forth). The control system 125 shown in FIG. 2 has a publisher 310 and five subscribers 315a . . . 315e, which may include controllers for subsidiary mechatronic systems such as, but not limited to, the robotic arm 105, the AM toolhead 135, the component gripping mechanism 140, the heated build surface 110, and the lateral movement device 120, among other potential components.

Accordingly, the control system 125 may include a host client or linker 305, a first controller adapted to control the robotic arm 105, a second controller adapted to control an actuator 160 configured to apply lateral force to the object as fabricated, and a third controller adapted to control the AM toolhead 135 and the component gripping mechanism 140 of the end effector 130. The first controller, the second controller, and the third controller may each be configured to subscribe to the host client or linker 305 through an instruction messaging service. For instance, corresponding instructions accessed by the host client or liner 305 may be pulled from the instruction messaging service by the first controller, the second controller, and the third controller, among other devices.

As publisher messages are run through a centralized linker 305, they can be broadcasted synchronously to each of the relevant subscribers 315. The subscribers 315 can then parse their specific messages and act accordingly by processing relevant instructions. Due to the modular nature of the publisher-subscriber network, this control system 125 can be easily expanded to accept sensor information for error correction, adapt to different models of robot systems, incorporate new tools into the autonomous fabrication system 100, and so forth.

Two software applications were developed and employed to generate assembly instructions for the autonomous fabrication system 100. An open-source MEX toolpath generation software was used to generate additive manufacturing operations, and a simulator for industrial robotics was used for importing additive manufacturing operations, generating PnP trajectories, combining the AM and PnP paths into a single instruction file, and simulating results.

Early in testing, manually generating collision-free PnP trajectories was complicated and time intensive. Notably, with every change in design of an object 200 or workcell layout, PnP trajectories needed to be updated and manually validated. Therefore, a more efficient solution for autonomously generating collision-free trajectories is described. The solution may include exporting keyframe positions for assembly from a computer aided design (CAD) application or like software, importing the keyframes into an industrial robotics simulator (e.g., RoboDK) along with workcell and drone standard triangle language (STL) files or like files, and running a script that automatically ties keyframes together with optimized, collision-free trajectories.

A rapidly-exploring-random-tree (RRT) algorithm, or other suitable collision aware/reward function aware path planning routine, may be employed to enable autonomous creation of collision-free trajectories with any collision volume, allowing easy path creation with new drone and object 200 designs and electronics modules. The RRT algorithm may be modified to sample space more efficiently through only sampling the workspace when a linear collision-free path does not exist between two keyframes. Using an automated path-planning workflow, time required to create and validate assembly instructions was reduced to thirty minutes from sixty-three minutes performing the tasks manually.

Figure 3A:
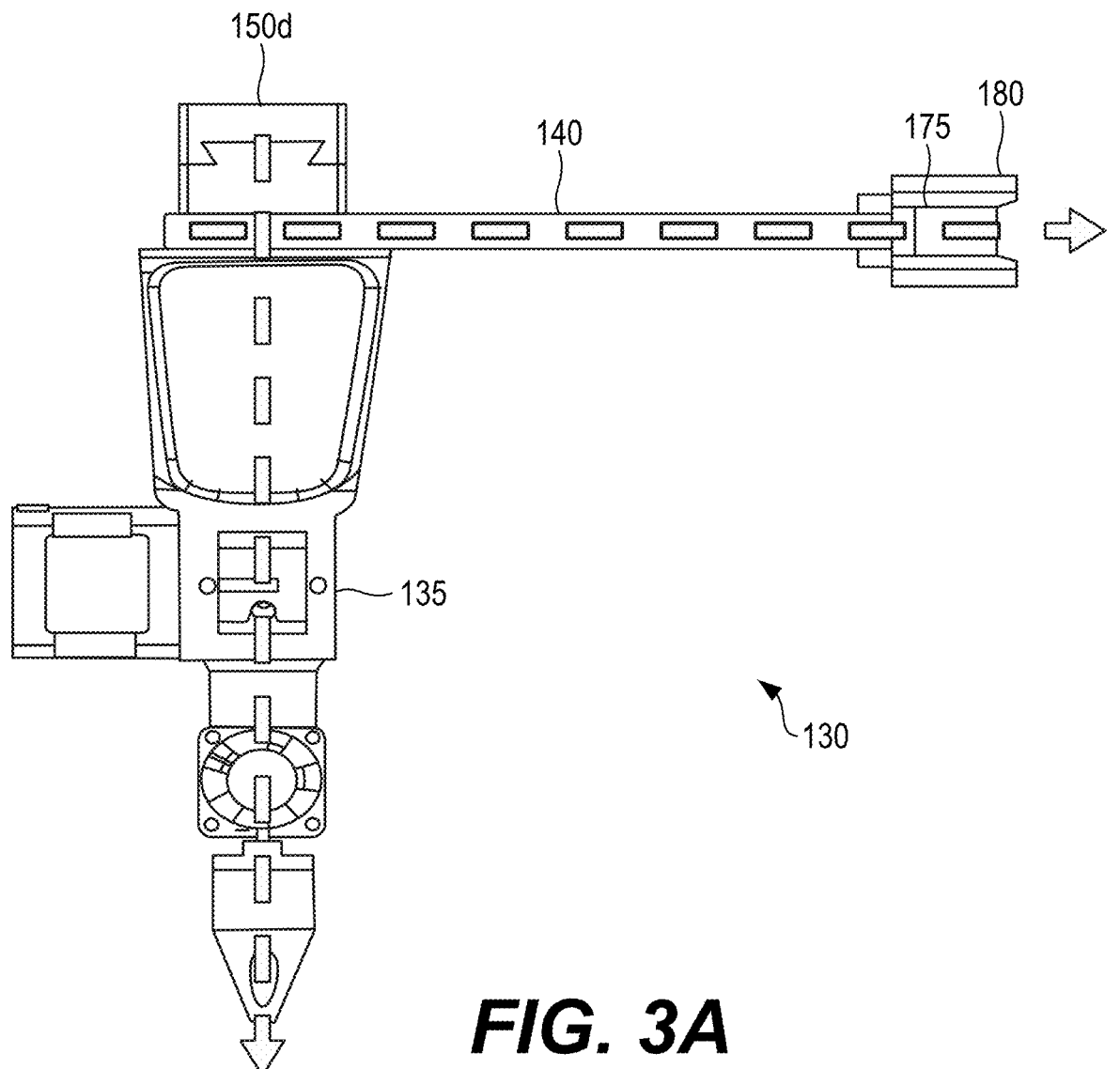
FIGS. 3A and 3B are examples of a hybrid additive manufacturing and pick-and-place end effector in accordance with various embodiments of the present disclosure.
Figure 3B:
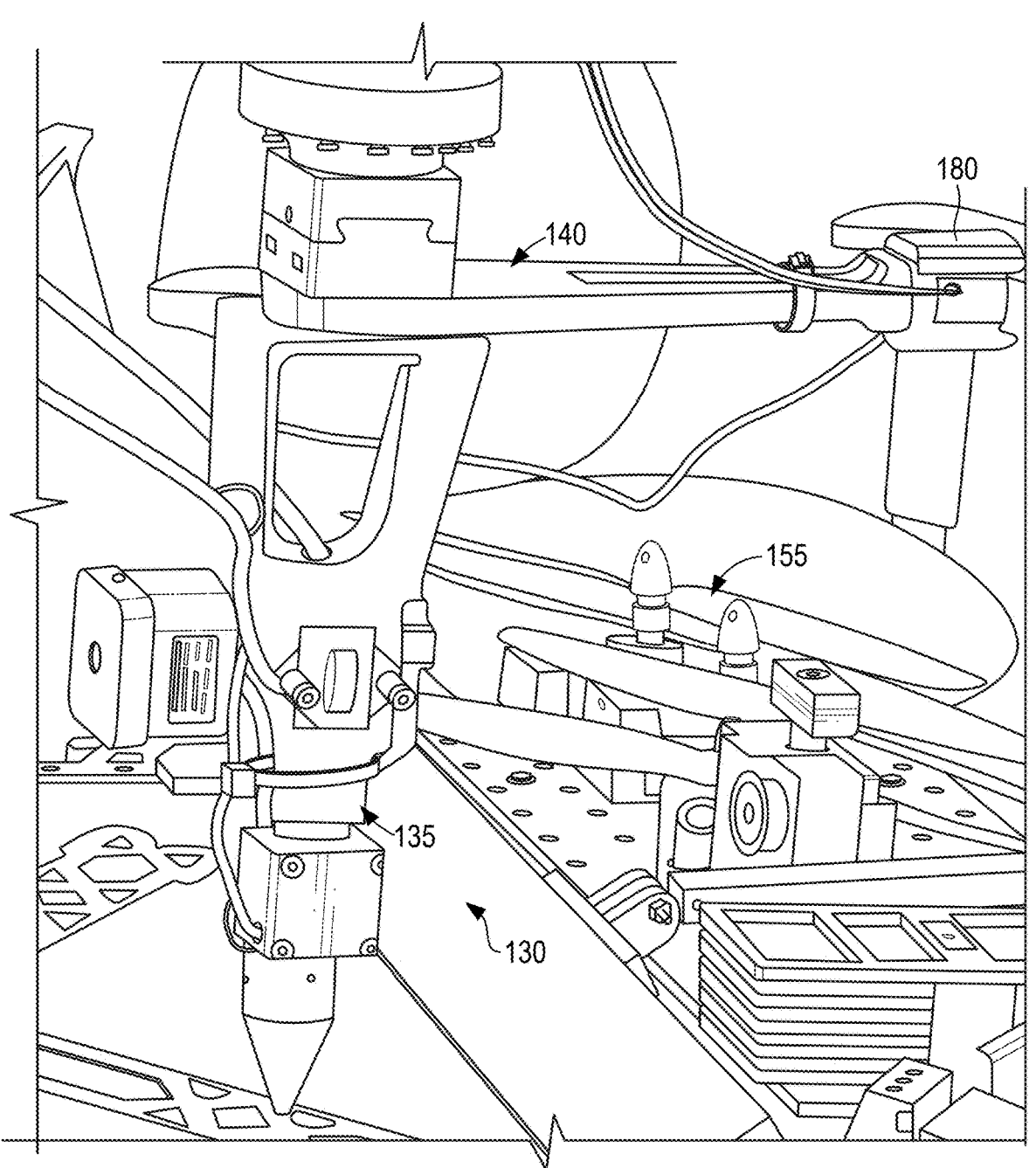

Referring now to FIGS. 3A and 3B, enlarged views of the end effector 130 are shown according to various embodiments. To reduce tool changing operations during fabrication and minimize process cycle time, an additive manufacturing toolhead 135 and a pick-and-place toolhead may be combined into a single end effector 130. Removing the need for a pneumatic tool changer and a tool storage solution increases reliability and robustness while also decreasing its overall footprint, making the autonomous fabrication system 100 more suited for deployment in completely autonomous environments.

In implementations in which the end effector 130 is a single end effector 130, the AM toolhead 135 and the component gripping mechanism 140 may be positioned orthogonal to one another. The AM toolhead 135 and the component gripping mechanism 140 may be fixedly attached to one another and, in some implementations, collectively may be pivotably coupled to a distal one of the segments 150d. The control system 125 may be configured to direct the robotic arm 105 to transition between the AM toolhead 135 and the component gripping mechanism 140 through a rotation of the single end effector 130 using, for example, a motor, actuator, or like device. Alternatively, in some implementations, the transition may include a physical tool change where the robotic arm 105 may pick up a first tooling (e.g., the AM toolhead 135) or the second tooling (e.g., the component gripping mechanism 140), or other tooling, to transition between toolings. Accordingly, the component gripping mechanism 140 may be placed at a 90 degree angle to the AM toolhead 135 to minimize potential collisions during printing and assembly. Rotating a "forearm" of the robotic arm 105 (e.g., Joints 4-6) enables rapid switching between the two functionalities.

Figure 4:
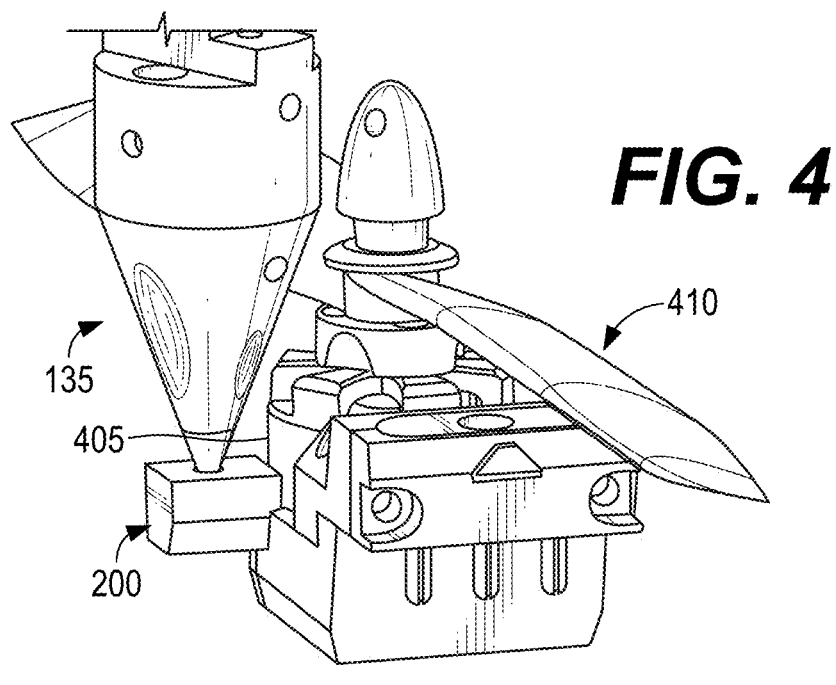
FIG. 4 illustrates hotend printing on an embedded motor and rotor module without collision in accordance with various embodiments of the present disclosure.

As shown in FIG. 3B, the AM toolhead 135 of the end effector 130 may include a MEX FFF system, such as one with a direct drive extruder. The AM toolhead 135 may further include a reduced-profile, 1.4 mm nozzle hotend. Such nozzle diameter allows for higher volume deposition, and the thin, pointed nature of the AM toolhead 135 (e.g., 5 cm long, 20 degree taper angle) allows the AM toolhead 135 to closely approach embedded components during embedding operations without collisions, as illustrated in FIG. 4. Specifically, FIG. 4 shows hotend printing on a prefabricated part 155 of an object 200 partially fabricated by the AM toolhead 135 without collision, where the prefabricated part 155 includes an embedded motor 405 and rotor 410.

As noted above, the component gripping mechanism 140 may include electric grippers, pneumatic grippers, suction cups or suction devices, magnetic grippers, mechanical grippers, and so forth. Referring back to FIGS. 3A and 3B, in various embodiments, to reduce need for high precision robotic alignment during pick-and-place operations, the component gripping mechanism 140 of the end effector 130 may include an electromagnet 175 and a shroud 180.

Figure 5:
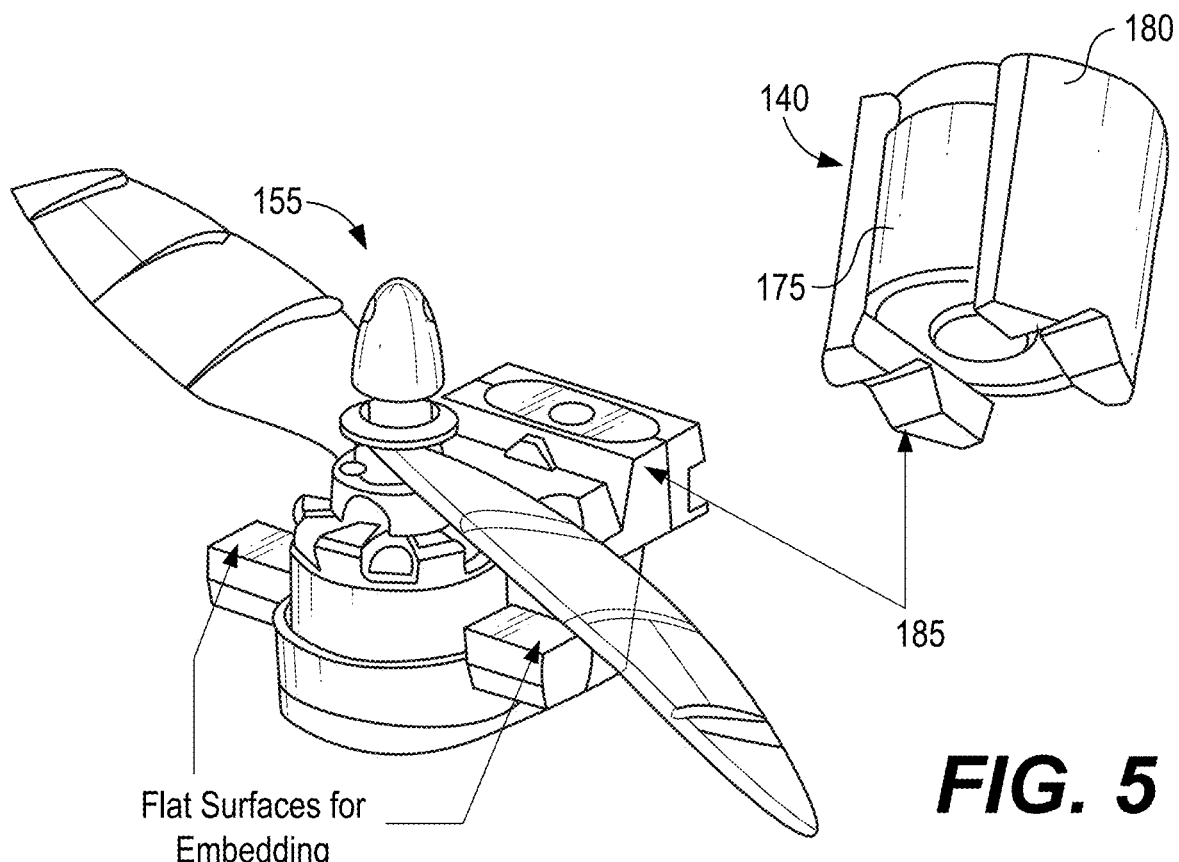
FIG. 5 is a pick-and-place tool and common pick-and-place interface on a motor and rotor module in accordance with various embodiments of the present disclosure.

The geometry of the shroud 180 may match with a common PnP interface located on each prefabricated part 155 (e.g., an electronic module), as shown in FIG. 5. For instance, the shroud 180 may include V-shaped or U-shaped notches on opposing sides that engage corresponding projections or like interfaces. This allows the component gripping mechanism 140 to pick up any prefabricated part 155, no matter its form factor, assuming the prefabricated part 155 includes the common PnP interface. The common PnP interface may be integral with the prefabricated part 155 or, alternatively, a carrier frame may be coupled to the prefabricated part to enable a coupling between the prefabricated part 155 and the shroud 180 of the component gripping mechanism 140. The common PnP interface may include beveled self-locating features 185 to allow a positional inaccuracy of up to two mm in each direction in some implementations. With magnetic auto-location, pick-and-place operations utilizing the component gripping mechanism 140 are fast, reliable, and do not require complex feedback systems (e.g., machine vision, force-torque control, and so forth).

Figure 6A:
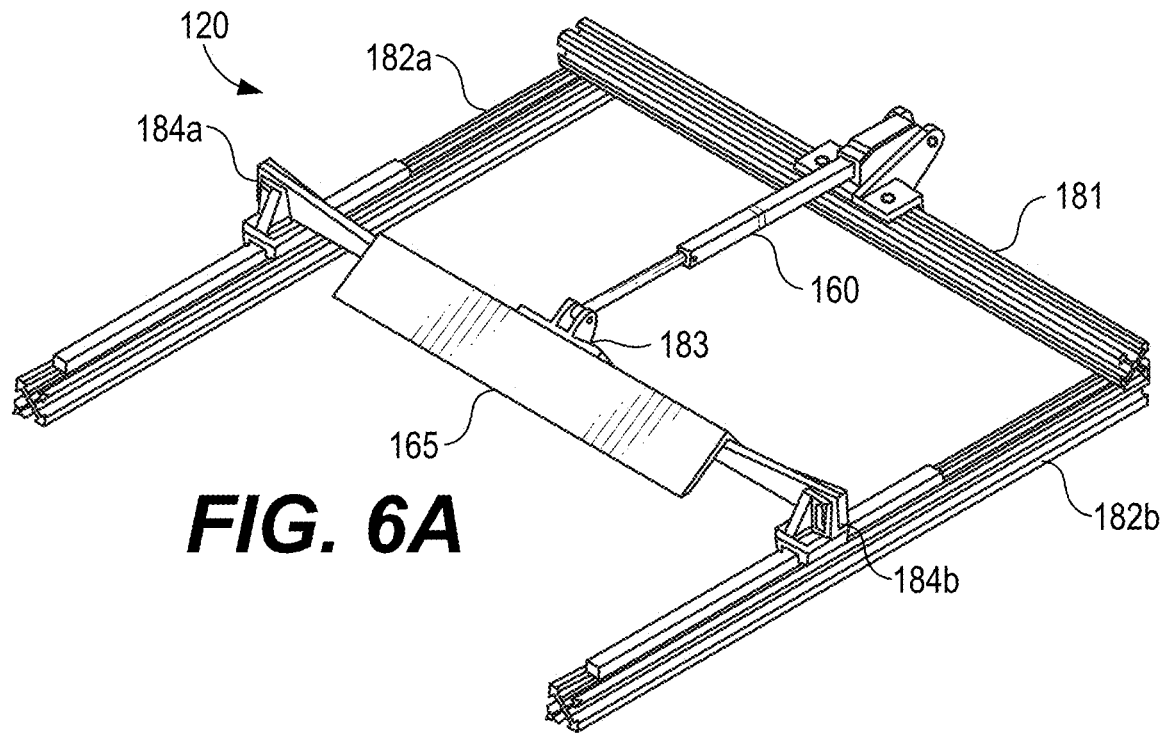
FIGS. 6A and 6B show a build surface and bed scraper in accordance with various embodiments of the present disclosure.
Figure 6B:
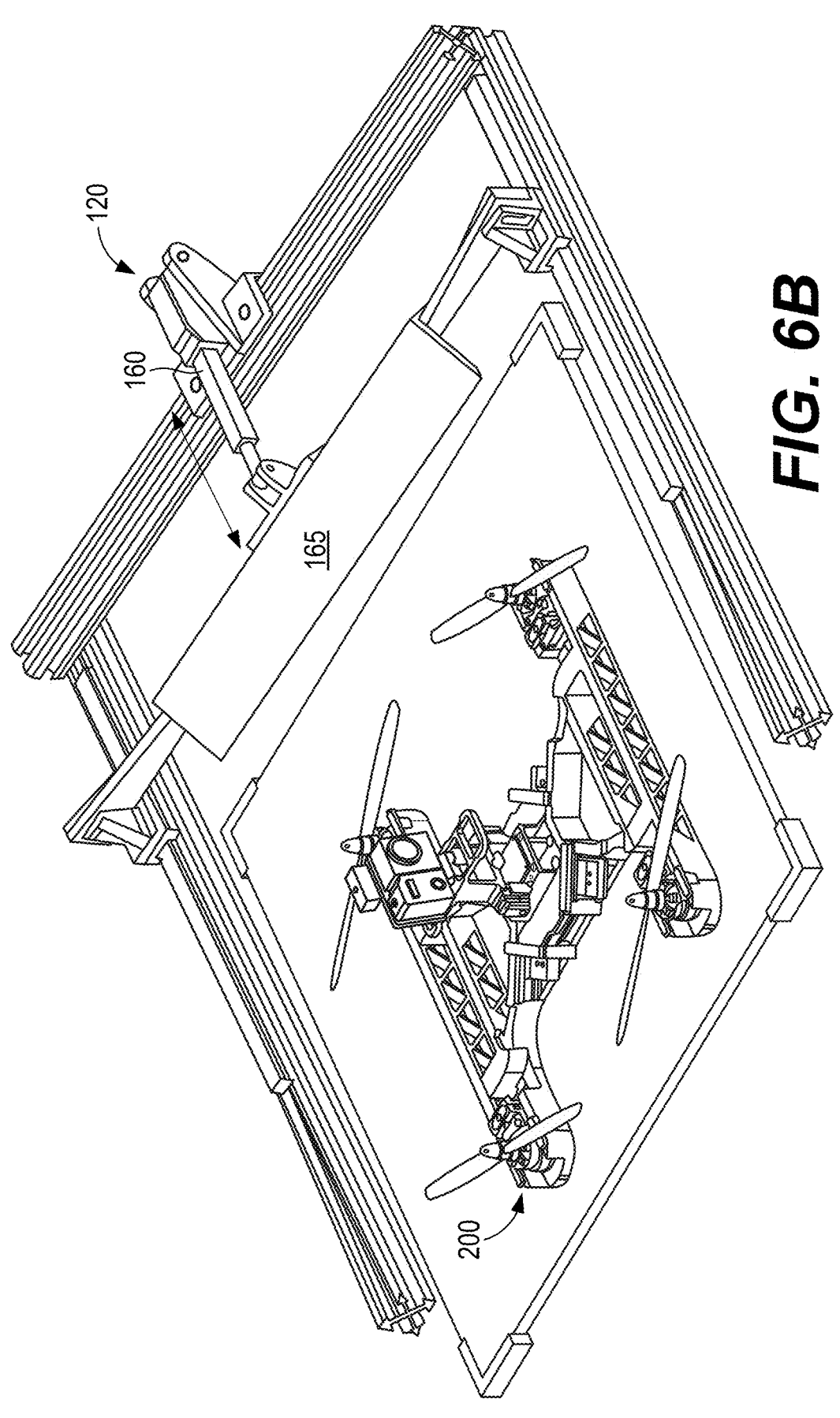

Moving along to FIGS. 6A and 6B, perspective views of the lateral movement device 120 are shown in accordance with various embodiments. Referring to FIGS. 6A and 6B collectively, to successively fabricate multiple mechatronic devices without manual involvement, it is beneficial for the autonomous fabrication system 100 to securely retain the fabricated object 200 on the build surface 110 during the additive manufacturing and pick-and-place operations, and release the fabricated object 200 once fabrication is complete. To accomplish this, the autonomous fabrication system 100 may include a heated build surface 110 coated with a polymer film, such as polyetherimide (PEI) film, for print adhesion and the lateral movement device 120 for print removal.

While hot, the build surface 110 as coated with PEI or other polymer may maintain a strong bond with the fabricated object 200 preventing the object 200 from shifting during fabrication. Once cooled (e.g., approximately 35° C.), the adhesion weakens sufficiently for the lateral movement device 120 (e.g., a linearly-actuated wedge) to separate the object 200 without structural damage. The lateral movement device 120 may further serve to remove any resulting support material or other debris from the build surface 110, enabling successive prints without human intervention.

The lateral movement device 120 may include the actuator 160 and the scraper 165 that may be positioned at an angle (e.g., 10 to 85 degrees) relative to the fabricated object 200. The actuator 160 may be electronically or electromechanically controlled by the control system 125 or other controller. Additionally, in some implementations, the lateral movement device 120 includes a cross-member 181 having a first end of the actuator 160 mounted thereon and side rails 182a, 182b positioned orthogonal to the cross-member 181. A second end of the actuator 160 may be pivotably mounted directly to the actuator 160, or may be pivotably coupled to an intermediary bracket 183. The scraper 165 may be coupled to legs 184a, 184b, where a first leg 184a is slidably coupled to a first side rail 182a, and a second leg 184b is slidably coupled to a second side rail 182b. Through movement of the actuator 160, the scraper 165 may move laterally with respect to the stationary cross-member 181.

Unmanned aerial systems (UASs), or drones, are critical for a wide range of applications from data acquisition to delivery. Prioritizing high volume production, current drone manufacturing methods utilize injection molded parts, require human operator inspection, and are postured to only produce a single, one-size-fits-all drone design. Current manufacturing methodologies follow traditional supply chains, requiring significant capital and time cost to retool and reconfigure for new designs (e.g., operator training, replacing injection mold dies, etc.). This makes the integration of design changes optimized for the environment slow and susceptible to political, economic, and environmental disruptions. Furthermore, finalized designs cannot be delivered immediately to replenish drone fleets or reflect immediate customer needs, and instead require a significant week shipping time.

The embodiments for the autonomous fabrication system 100 described herein may alleviate current drone manufacturing limitations, especially in a decentralized manufacturing operation, as the autonomous fabrication system 100 may rapidly adapt to UAS design changes informed by the end-use environment for time and cost savings. With the flexibility of additive manufacturing and modular electronic construction, chassis designs, battery sizes, rotor sizes, etc. may be quickly changed. This allows users to quickly modulate key UAS performance metrics such as flight time, maneuverability, weight, and size.

Figure 7A:
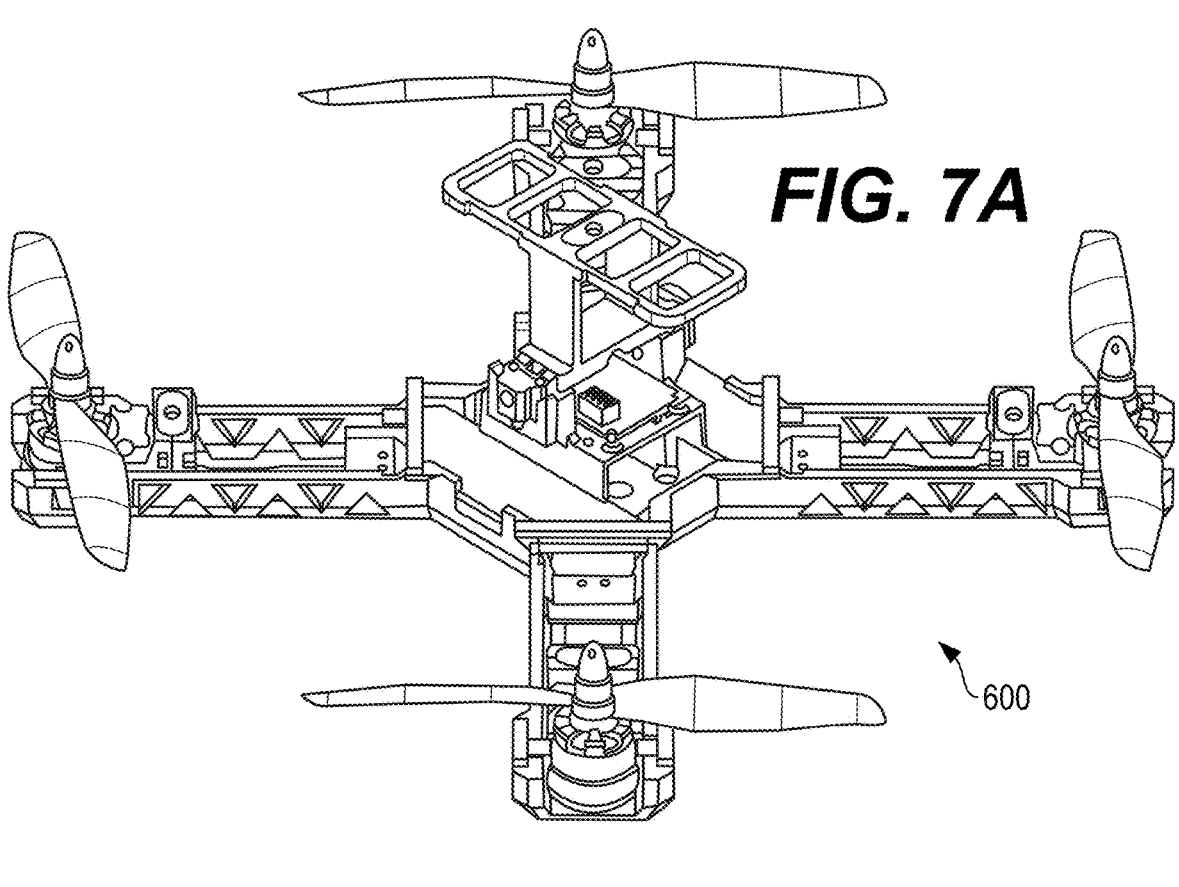
FIGS. 7A and 7B are example embodiments of a quadcopter design that may be fabricated using the autonomous fabrication system in accordance with various embodiments of the present disclosure.
Figure 7B:
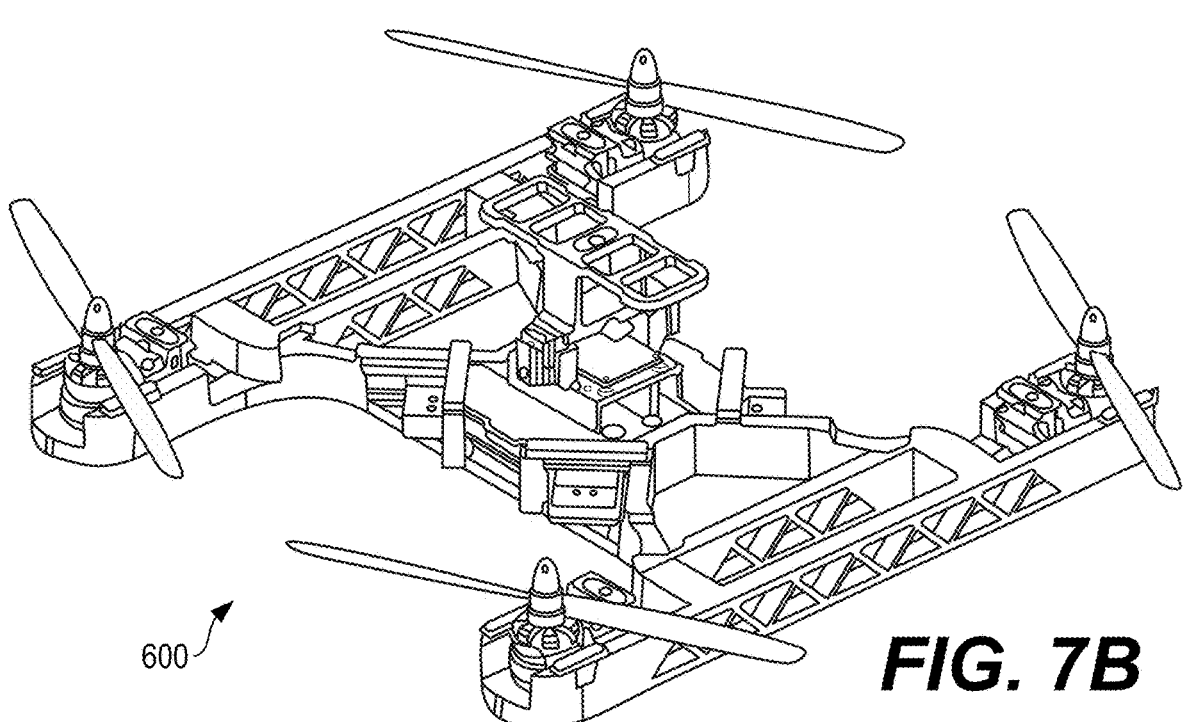

FIGS. 7A and 7B are objects 200 fabricated using the autonomous fabrication system 100 or, more specifically, drones 600 fabricated using the autonomous fabrication system 100. The drone 600 shown in FIG. 7A includes a quadcopter design having an x-frame configuration with a 3000 mAh battery and eight-inch propellers, whereas the drone 600 shown in FIG. 7B includes an H-frame configuration with a 4200 mAh battery and ten-inch propellers.

To demonstrate and assess the capabilities of the autonomous fabrication system 100, a case study was designed to manufacture two drones as objects 200 fabricated in succession and have the two drones fly away from the build surface 110 once completed. A quadcopter configuration was chosen for both drone designs due to vertical takeoff capabilities, making it ideal for the drones to leave the autonomous fabrication system 100 by flying directly off of the build surface 110 or build area 115. The designs of these two drones both consisted of an additively manufactured chassis with embedded electronic modules, as shown in FIGS. 7A and 7B. The overall assembly process includes fabricating a drone chassis of the drone 600 through additive manufacturing using the AM toolhead 135, inserting prefabricated parts 155 (e.g., electronic modules), fabricating a remainder of the chassis to embed and secure the inserted prefabricated parts 155, and removing the drone 600 via the lateral movement device 120.

Figure 8:
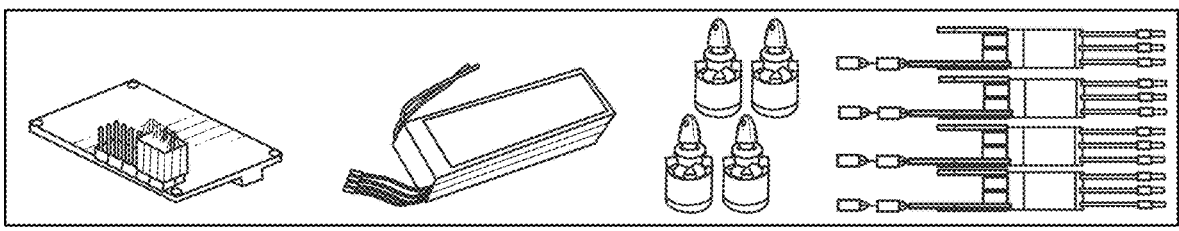
FIG. 8 shows various quadcopter electronics modules, each featuring a common pick-and-place interface in accordance with various embodiments of the present disclosure.
Figure 8:
Figure 8:
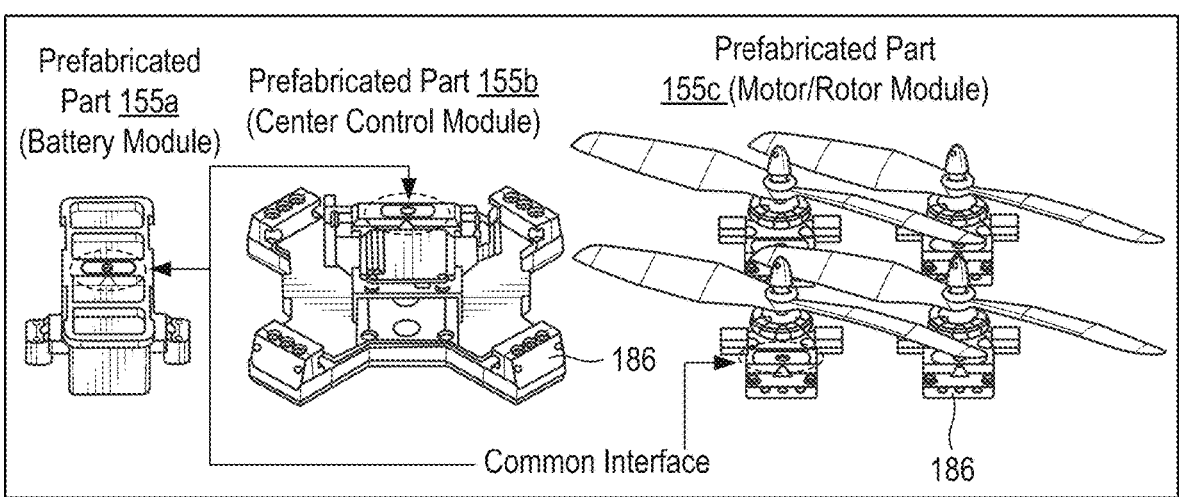

Moving along to FIG. 8, non-limiting examples of prefabricated parts 155a . . . 155c, namely, quadcopter electronics modules are shown, each featuring a common PnP interface. The common PnP interface may include a housing detachably attachable to a prefabricated part 155, having flat faces or surfaces for subsequent embedding made out of a common material as the drone chassis. In further implementations, the common PnP interface may include one or more electric connectors 186, as shown in FIG. 8. Encapsulating electronics pieces inside modules with common connectors allows freedom to swap components (e.g., battery, sensors, etc.) for varying performance metrics. Yet as the number of modules increases, the size and weight of the device, manufacturing cycle time, and probability of assembly error increases. Therefore, a balance must be achieved between module quantity, desired design freedom, and manufacturing constraints.

For a quadcopter assembly, electronic components may include a flight controller (e.g., a drone controller module or a microcontroller), four electronic speed controllers (ESCs), four motors with propellers, and a battery, each shown in FIG. 8. An imaging device, such as a camera, may also be included for capturing in-flight footage. The listed electronics pieces in Table 1 were grouped together in modules to maximize design freedom in changing drone weight, flight time, payload capacity, sensing, and vehicle software.

TABLE 1

| Electronics Module Groupings and Associated UAS Metrics | | | | |
| --- | --- | --- | --- | --- |
| Electronics Module | Electronics Components | UAS Metric | Quantity | Price ($) |
| Motor Module | Propellers, Motors | Payload capacity, Flight Time | 4 | 46.50 |
| Battery Module | Battery | Flight Time, Drone Weight | 1 | 44.99-51.99 |
| Center Control Module | Flight Controller, ESCs, Coiled Wire | Vehicle software | 1 | 86.71 |
| Camera Module | Camera | Sensing | 1 | 74.72 |

By separating electronic components into modules, there are a total of five electrical connections needed during assembly. For a desired quadcopter size, each electrical connection must sustain 30 W, necessitating at least 18 gauge wire. To accommodate these specifications, the electrical components of each prefabricated part 155 may be pre-wired to friction-fit pin connectors. This allows the robot to plug in power and signal connections between modules, for full-scale mechatronic modularity.

Figure 9:
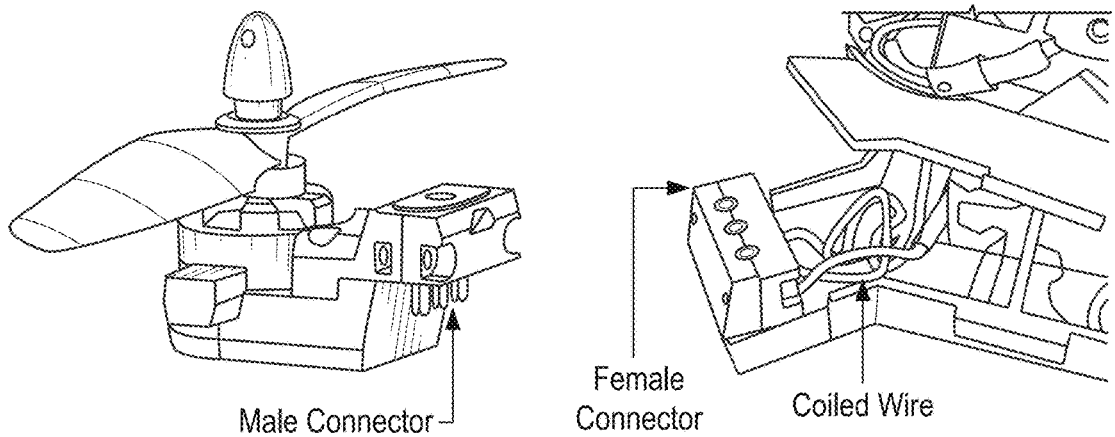
FIG. 9 shows a control module without a top cover, exposing wire coil reservoirs that allow electronics to adapt to a variety of mechatronic systems with varying arm length in accordance with various embodiments of the present disclosure.

As the size and configuration of the mechatronic device changes (e.g., True-X frame quadcopter, H frame quadcopter, etc.), the distance between modules will change. Thus, to reuse the same module design in each of these mechatronic applications, the solution relies on excess wire being coiled up and stored inside the modules. An example of this solution being used for quadcopter fabrication is illustrated in FIG. 9, where the central control package contains excess wire to span the distance between itself and the motor.

Figure 10:
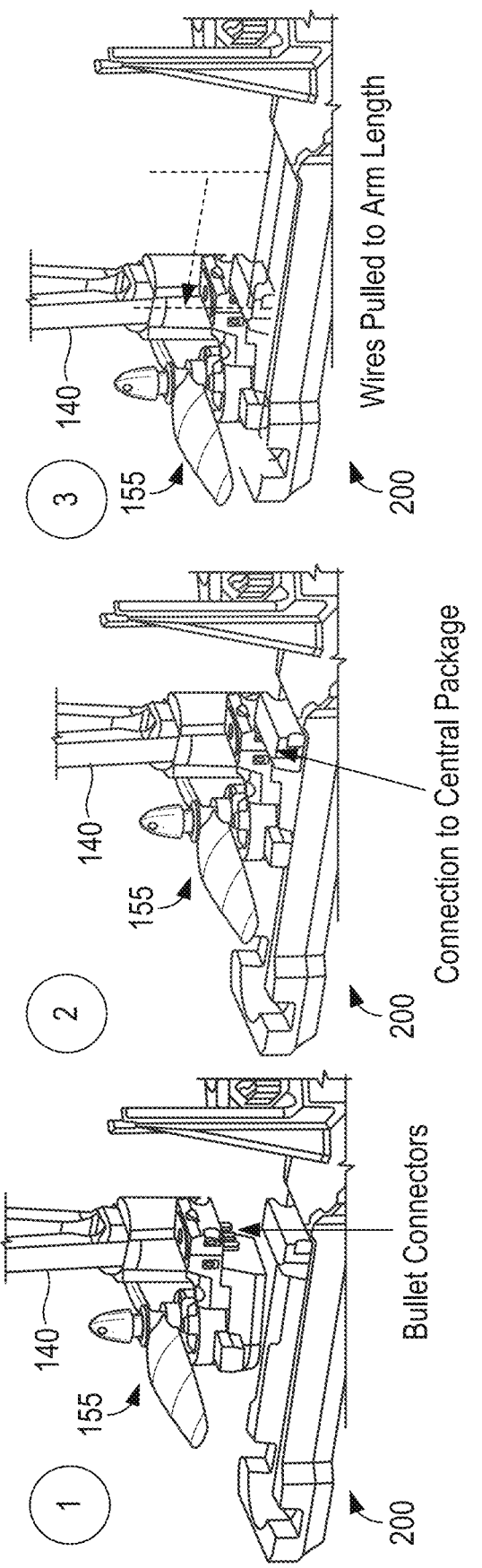
FIG. 10 is a robotic process for connecting motor modules to a central control module in accordance with various embodiments of the present disclosure.

FIG. 10 depicts a robotic process for connecting motor modules or other electronic prefabricated parts 155 to a central control module. Connecting a motor to a receptacle on the central package allows the embedded wire to uncoil, thus enabling positioning the motor to any length of drone arm. Following robotic insertion of the central control module into the printed drone frame, the component gripping mechanism 140 then picks up a motor module and connects it to a receptacle located on the central control module via bullet connectors. Lastly, the motor module, along with the receptacle, is robotically moved and positioned to an end of the drone arm, where this motion path causes wire to uncoil to the exact length needed.

A final electrical connection, between the battery and central module, may be independent of size and configuration changes. The designed solution utilizes the same friction-fit pin connectors as the motor modules except in a fixed, two-wire male/female connection pair. The component gripping mechanism 140 may retrieve and lower a battery down onto a center control module, where electrical connectors are joined and power is provided to the flight controller and all four ESCs. Due to the standardized connection geometry, modules can be easily swapped as the needs of the quadcopter changes (e.g., battery, flight controller, ESCs, etc.).

Figures 11A, 11B:
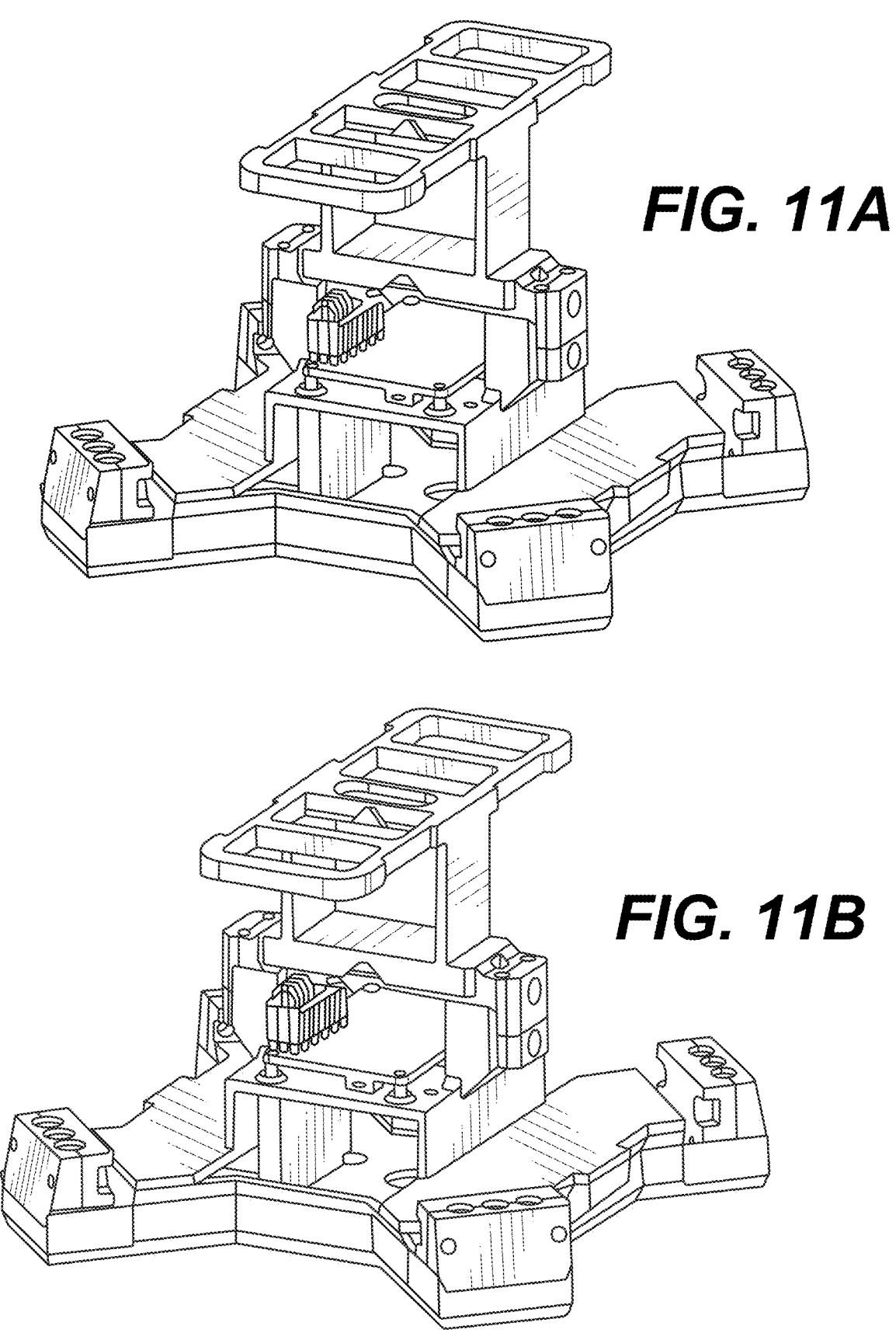
FIGS. 11A, 11B, and 11C show small (3000 mAh), medium (4200 mAh), and large (10000 mAh) batteries, respectively, that may be mounted to a mechatronic system in accordance with various embodiments of the present disclosure.
Figure 11C:
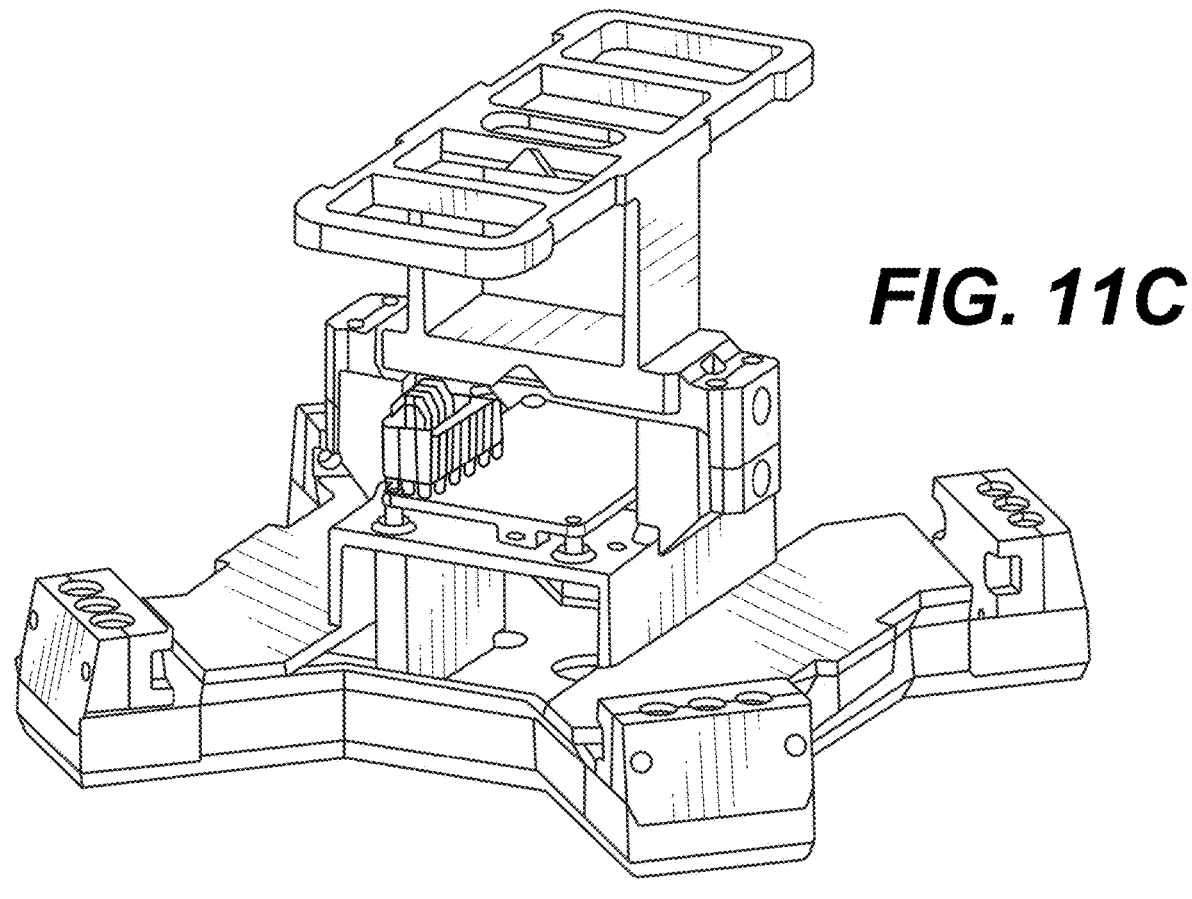

An example of this capability is illustrated in FIGS. 11A-11C with the same central control package connected to three different battery sizes. Specifically, FIGS. 11A-11C depict a modular approach that enables a small battery (e.g., 3000 mAh), as shown in FIG. 11A, a medium battery (e.g., 4200 mAh), as shown in FIG. 11B, and a large battery (e.g., 10000 mAh), as shown in FIG. 11C, to be mounted on the same center control module.

Accordingly, referring again to FIG. 10, after a first electronic device has been placed on the object 200, the autonomous fabrication system 100 may select, by the robotic arm 105, a second electronic device using the component gripping mechanism 140 and form a wired connection between the first electronic device and the second electronic device. The robotic arm 150 may then place the second electronic device in a predetermined location of the object such that the wired connection is maintained, where the predetermined location is not the same as a location whether the electronic connection was established.

In some embodiments, forming the wired connection between the first electronic device and the second electronic device (or, in other words, a first prefabricated part 200 and a second prefabricated part 200) may include orienting, by the robotic arm 105, the second electronic device proximate to a first connector of the first electronic device, the second electronic device comprising a second connector, the first connector being coupled to a wire, and positioning, by the robotic arm 105, the second prefabricated part towards proximate to a first connector of the first electronic device such that the first connector and the second connector are coupled to one another through the wire. Further, the robotic arm 105 may reposition the second electronic device to the predetermined location of the object such that the wired connection is maintained.

Figure 12:
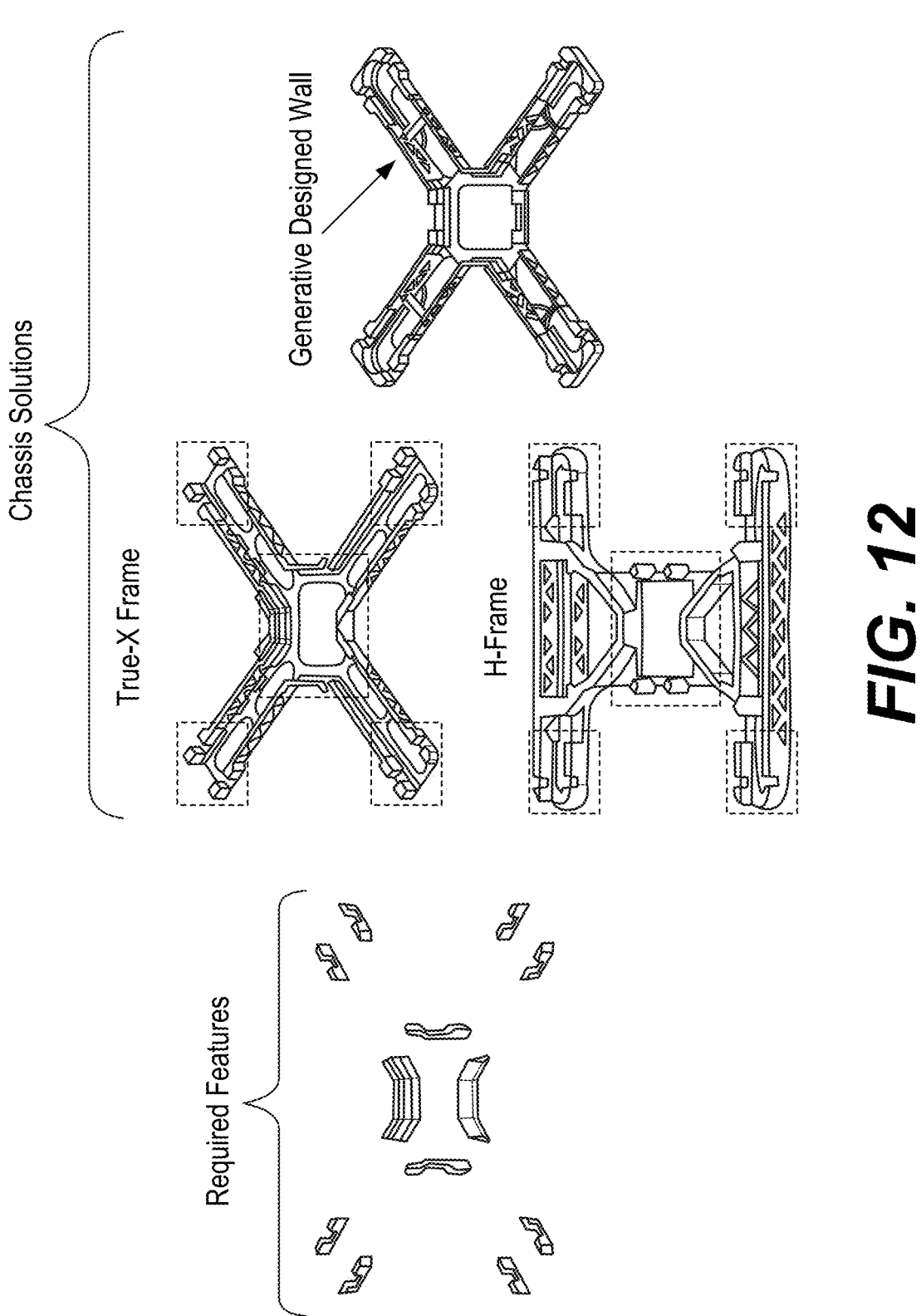
FIG. 12 show various features for interfacing electronics modules, and adaptability to differing chassis designs per mission in accordance with various embodiments of the present disclosure.

To assist in locating electronics modules of a drone 600 during PnP operations and fixing them in place during subsequent fabrication (e.g., embedding printing), a set of common structural features for the chassis may be defined. In some implementations, these features may be designed to be as small as possible to maximize the amount that the chassis can be customized for a specific use case, as shown in FIG. 12. These required chassis features also incorporate beveled edges that work concurrently with the beveled edges on the bottom of each module to allow for up to 2 mm of potential error in each direction during assembly.

The True-X and H-Frame chassis configurations included these features, and may be designed following best practices for additive manufacturing. The chassis were lightweight lattice structures specifically designed to not require secondary support structures during fabrication. This design consideration further decreases dependency on post-processing, thus reducing manufacturing cycle time and material waste.

Figures 13, 14:
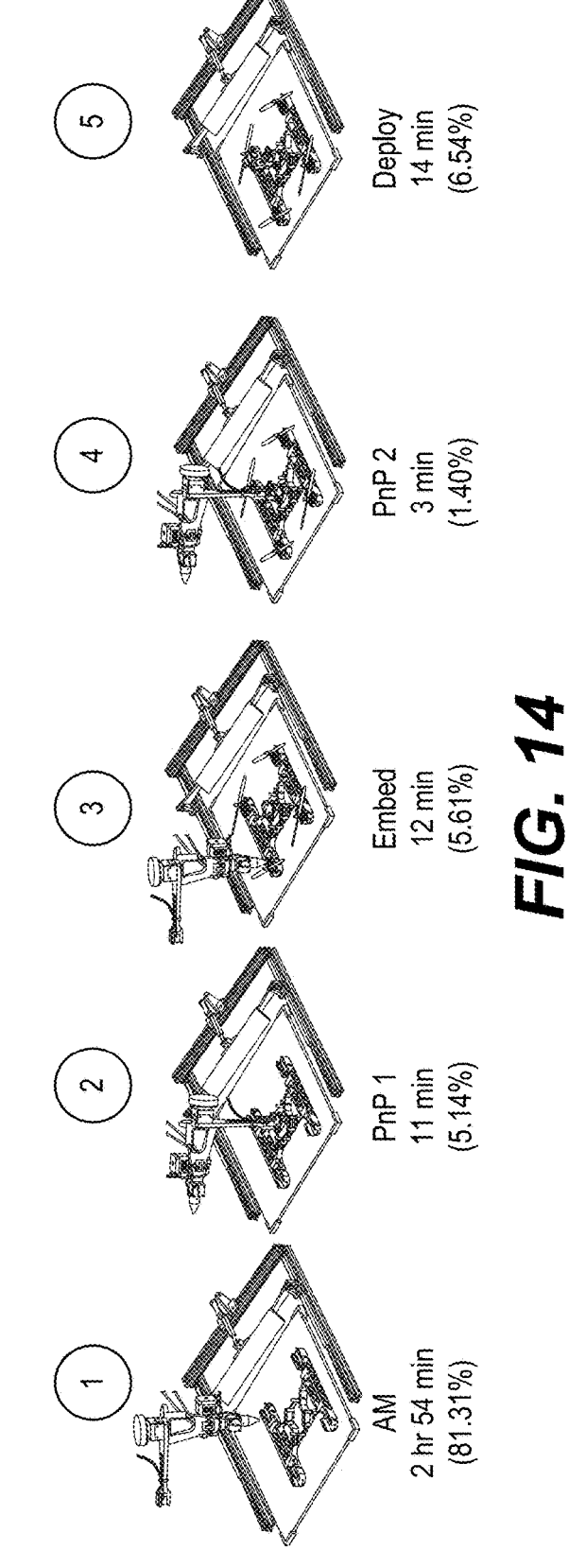
FIG. 13 is a sequence diagram showing construction of a first type of mechatronic system in accordance with various embodiments of the present disclosure.
FIG. 14 is a sequence diagram showing construction of a second type of mechatronic system in accordance with various embodiments of the present disclosure.

The two drone designs were constructed by the autonomous fabrication system 100 to test the modularity of the autonomous fabrication process and identify manufacturing constraints for rapid drone manufacture. Both drone construction cycles consisted of three-dimensional printing the bottom of the drone chassis, placing the control and motor electronics modules, three-dimensional printing over the placed modules (e.g., part embedding), placing a battery module, releasing the drone, and instructing the drone to fly a predetermined path. An overview of the overall fabrication process is shown for both the True-X frame drone in FIG. 13 and the H-frame drone in FIG. 14. In addition, the combined, autonomous fabrication of both drones can be seen in the accompanying video.

Both the True-X frame and H-frame drone designs were manufactured in under four hours. As noted in FIGS. 13 and 14, roughly 79% of manufacturing time in both drone builds was spent printing the chassis. After the bottom of the chassis is fabricated, the center control module may be placed into the printed chassis. With the center chassis inserted, motor modules may then be picked and connected to the center chassis. Since the center control module contains a reservoir of spooled wire, shown in FIG. 9, attached motor modules may be drawn out to match the current UAS arm length, shown in FIG. 10.

Figures 15, 16:
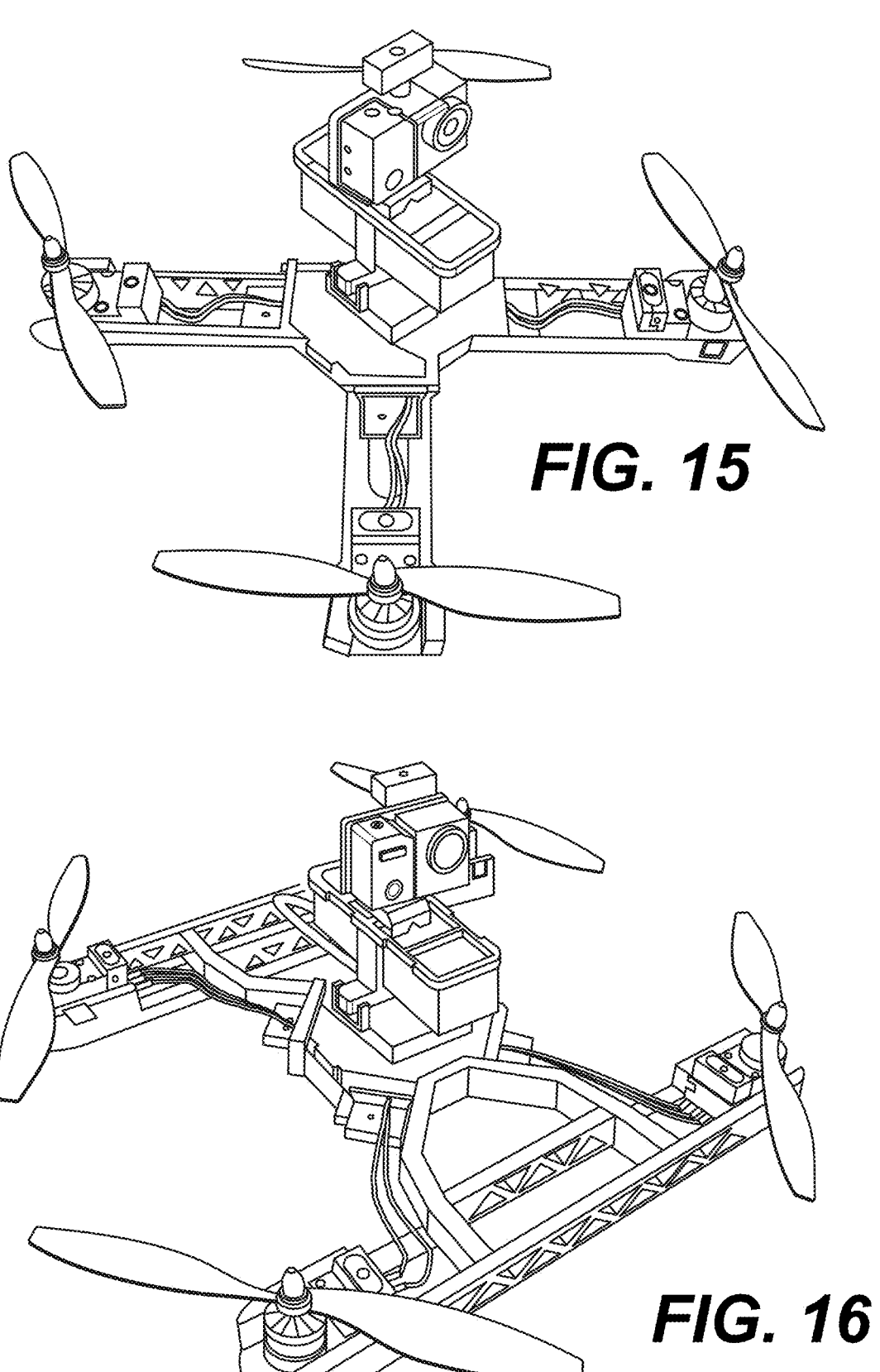
FIGS. 15 and 16 are enlarged views of a first and second type of mechatronic system, respectively, that are fabricated using the autonomous fabrication in accordance with various embodiments of the present disclosure.

Next, the AM toolhead 135 may be directed to print material over the center and motor modules, securing them in place. Finally, a battery module may be placed onto a center control module of the drone 600, powering and turning on the drone 600. Once on, propellers of the drone 600 may be used to actively cool the print bed for quick separation of the printed chassis. After cooling, the fabricated drones 600 may be fully released from the build surface 110 using the lateral movement device 120, which enabled the drones 600 to fly into a designated environment. Both finished drones can be viewed in FIGS. 15 and 16, which includes a true-x frame and h-frame test drone, respectively. The h-frame drone features a larger battery and propellers as well as a completely different wiring path.

As noted in Table 2, the produced drones 600 are inexpensive (~$270), owing only to the purchase of raw materials (e.g., electronics modules, wires, and 3D printing filament). The design of the autonomous fabrication system 100 and of the modular electronics components allows the fabrication process to circumvent large investments of money and time typically associated with design changes in conventional manufacturing, such as replacing and fabricating bespoke injection mold tooling for each design change, updating human assembly training, and shipping. In accordance with various embodiment, the presented approaches use hand-assembled electronics modules that are pre-positioned for robotic insertion. This is done since today's electronic components are designed for manual assembly (e.g., the mounting screw holes on brushless motors). However, mass-produced modules designed specifically for robotic assembly (e.g., featuring self-locating features and manufactured through injection molding, PCB etching, vacuum forming, etc.) can be coupled with the autonomous fabrication system 100. Fiducials or other spatial markers may be placed on the outside of modules placed on the exterior of modules to guide autonomous identification using visual inspection, grasping, and insertion.

TABLE 2

Performance Metrics of the Autonomous Fabrication System 100 in the UAS Construction Case Study

| Metric | Units | H-Frame | True-X Frame |
|---|---|---|---|
| Manufacture Cycle Time | (hr) | 4.1 | 2.63 |
| Human Involvement during Robotic Printing/Assembly | (% Cycle Time) | 0 | 0 |
| Drone Cost | ($) | 281 | 263 |

Accordingly, various embodiments are described for the autonomous fabrication system 100 that can autonomously fabricate complex mechatronic devices by combining AM and PnP functionality with a robotic arm 105 and, specifically, a 6-DoF robotic arm. A case study in which two different quadcopter UAS are fabricated with no human involvement was demonstrated to validate the efficacy, flexibility, and autonomy of the autonomous fabrication system 100. In addition, for the UAS study, a robust and modular drone framework is introduced that enables flexible redesign and facile fabrication of new drone configurations via robotic assembly. Taken together, a new manufacturing process that is capable of rapid on-site fabrication of reconfigurable drones with minimal human involvement is demonstrated. In one completely autonomous system, the UAS bodies are printed, have functional hardware placed inside, electronically connected, embedded, and fly out of the autonomous fabrication system 100 at cycle finish.

The use of additive manufacturing and a common electronics infrastructure reduces the logistical strain of the autonomous fabrication system 100, requiring, for example, filament, power, digital toolpath and assembly instructions, and the prefabricated drone modules. This facet allows future iterations of the presented hybrid robotic autonomous fabrication system 100 to be deployable into regions outside of existing supply chains. The autonomous fabrication system 100 can be deployed in humanitarian missions, municipalities to support the growth of drone delivery, or eventually extraterrestrial missions to enable advanced, autonomous surveying for future human explorers.

The publisher-subscriber control architecture described herein enables scaling up the autonomous fabrication system 100 to a larger robotic platform and incorporating additional functionality. Integrating tool changing capability in the larger system for additional subtractive machining, inspection, and a wire embedding tool enables additional geometric complexity and precision. The control architecture could also include feedback from real-time spatial tracking of PnP operations, which is critical to formulating an adaptive and autonomous fabrication system 100 that can recover from assembly errors. Combined with the greater kinematic flexibility of a longer robotic arm, the autonomous fabrication system 100 could quickly expand its portfolio of built vehicles to fixed wing UASs and ground vehicles. The resulting autonomous fabrication system 100, which combines digitally-integrated manufacturing, robotics and automation, and hybrid process manufacturing, will be able to complete functional mechatronic systems with no human involvement to meet customer needs just-in-time and at the point of need.

The features, structures, or characteristics described above may be combined in one or more embodiments in any suitable manner, and the features discussed in the various embodiments may be interchangeable, if possible. In the following description, numerous specific details are provided in order to fully understand the embodiments of the present disclosure. However, a person skilled in the art will appreciate that the technical solution of the present disclosure may be practiced without one or more of the specific details, or other methods, components, materials, and the like may be employed. In other instances, well-known structures, materials, or operations are not shown or described in detail to avoid obscuring aspects of the present disclosure.

Although the relative terms such as "on," "below," "upper," and "lower" are used in the specification to describe the relative relationship of one component to another component, these terms are used in this specification for convenience only, for example, as a direction in an example shown in the drawings. It should be understood that if the device is turned upside down, the "upper" component described above will become a "lower" component. When a structure is "on" another structure, it is possible that the structure is integrally formed on another structure, or that the structure is "directly" disposed on another structure, or that the structure is "indirectly" disposed on the other structure through other structures.

In this specification, the terms such as "a," "an," "the," and "said" are used to indicate the presence of one or more elements and components. The terms "comprise," "include," "have," "contain," and their variants are used to be open ended, and are meant to include additional elements, components, etc., in addition to the listed elements, components, etc. unless otherwise specified in the appended claims.

The terms "first," "second," etc. are used only as labels, rather than a limitation for a number of the objects. It is understood that if multiple components are shown, the components may be referred to as a "first" component, a "second" component, and so forth, to the extent applicable.

The above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. An autonomous fabrication method, comprising:
providing a multi-axis robotic arm having at least one end effector, wherein the at least one end effector comprises an additive manufacturing (AM) toolhead and a component gripping mechanism;
directing, by processing circuitry, the multi-axis robotic arm, to select a prefabricated part using the component gripping mechanism and placing, by the multi-axis robotic arm, the prefabricated part in a predetermined location of an object, wherein the object is an unmanned aerial vehicle, an unmanned ground-based vehicle, or an unmanned water-based vehicle; and
fabricating, by the multi-axis robotic arm, a portion of the object in a workspace using the AM toolhead.

2. The autonomous fabrication method according to claim 1, wherein:
the prefabricated part is a plurality of prefabricated parts having a common set of design features, at least two of the plurality of prefabricated parts selected from a group consisting of: a battery; a microcontroller; an imaging device; a motor; a propeller; a wheel; a global positioning system (GPS) module; and a networking module; and
the autonomous fabrication method further comprises, after completion of fabrication of the object, instructing the object to navigate a predetermined path directly from the workspace.

3. The autonomous fabrication method according to claim 2, further comprising directing, by the processing circuitry, an actuator to apply force laterally to the object as fabricated prior to instructing the object to navigate the predetermined path.

4. The autonomous fabrication method according to claim 1, wherein:
the portion of the object is a second portion of the object fabricated after placement of the prefabricated part;
the method further comprises, prior to placement of the prefabricated part, fabricating, by the multi-axis robotic arm, a first portion of the object in the workspace using the AM toolhead; and
the prefabricated part as selected is one of a plurality of prefabricated parts having a common set of design features positioned separate from and proximate to the workspace.

5. The autonomous fabrication method according to claim 1, wherein:
the at least one end effector is a single end effector having the AM toolhead and the component gripping mechanism, the AM toolhead and the component gripping mechanism being positioned orthogonal to one another; and the autonomous fabrication method further comprises directing, by a controller of the processing circuitry, the multi-axis robotic arm to transition between the AM toolhead and the component gripping mechanism through a rotation of the single end effector.

6. The autonomous fabrication method according to claim 1, wherein:

the prefabricated part as placed is a first electronic device;

the autonomous fabrication method further comprises selecting, by the multi-axis robotic arm, a second electronic device using the component gripping mechanism;

forming, by the multi-axis robotic arm, a wired connection between the first electronic device and the second electronic device; and placing, by the multi-axis robotic arm, the second electronic device in the predetermined location of the object such that the wired connection is maintained.

7. The autonomous fabrication method according to claim 6, wherein the forming, by the multi-axis robotic arm, the wired connection between the first electronic device and the second electronic device further comprises:

orienting, by the multi-axis robotic arm, the second electronic device positioned proximate to a first connector of the first electronic device, the second electronic device comprising a second connector, the first connector being coupled to a wire;

positioning, by the multi-axis robotic arm, a second prefabricated part proximate to the first connector of the first electronic device such that the first connector and the second connector are coupled to one another through the wire; and repositioning, by the multi-axis robotic arm, the second electronic device in the predetermined location of the object such that the wired connection is maintained.

8. The autonomous fabrication method according to claim 1, further comprising:

providing a host client, a first controller of the processing circuitry configured to control the multi-axis robotic arm, a second controller of the processing circuitry configured to control an actuator configured to apply lateral force to the object as fabricated, and a third controller of the processing circuitry configured to control the AM toolhead and the component gripping mechanism of the end effector; and subscribing, by the first controller of the processing circuitry, the second controller of the processing circuitry, and the third controller of the processing circuitry, with the host client through an instruction messaging service, wherein corresponding instructions accessed by the host client are pulled from the instruction messaging service by the first controller of the processing circuitry, the second controller of the processing circuitry, and the third controller of the processing circuitry.

9. The autonomous fabrication method according to claim 1, wherein the multi-axis robotic arm has six degrees-of-freedom (6-DoF).

10. An autonomous fabrication system, comprising:

a multi-axis robotic arm having at least one end effector, wherein the at least one end effector comprises an additive manufacturing (AM) toolhead and a component gripping mechanism; and processing circuitry configured to:

direct the multi-axis robotic arm to select a prefabricated part using the component gripping mechanism and place the prefabricated part in a predetermined location of an object, wherein the object is an unmanned aerial vehicle, an unmanned ground-based vehicle, or an unmanned water-based vehicle; and direct the multi-axis robotic arm to fabricate a portion of the object in a workspace using the AM toolhead.

11. The autonomous fabrication system according to claim 10, wherein:

the prefabricated part is a plurality of prefabricated parts having a common set of design features, at least two of the plurality of prefabricated parts selected from a group consisting of: a battery; a microcontroller; an imaging device; a motor; a propeller; a wheel; a global positioning system (GPS) module; and a networking module; and the processing circuitry is further configured to, after completion of fabrication of the object, instruct the object to navigate a predetermined path directly from the workspace.

12. The autonomous fabrication system according to claim 11, wherein the processing circuitry is further configured to engage an actuator to apply force laterally to the object as fabricated prior to the object navigating the predetermined path.

13. The autonomous fabrication system according to claim 10, wherein:

the portion of the object is a second portion of the object fabricated after placement of the prefabricated part;

the processing circuitry is further configured to, prior to placement of the prefabricated part on the object, direct the multi-axis robotic arm to fabricate a first portion of the object in the workspace using the AM toolhead; and the prefabricated part as selected is one of a plurality of prefabricated parts having a common set of design features positioned separate from and proximate to the workspace.

14. The autonomous fabrication system according to claim 10, wherein:

the at least one end effector is a single end effector having the AM toolhead and the component gripping mechanism, the AM toolhead and the component gripping mechanism being positioned orthogonal to one another; and the processing circuitry is further configured to direct the multi-axis robotic arm to transition between the AM toolhead and the component gripping mechanism through a rotation of the single end effector.

15. The autonomous fabrication system according to claim 10, wherein:

the prefabricated part as placed is a first electronic device;

the processing circuitry is further configured to:

instruct the multi-axis robotic arm to select a second electronic device using the component gripping mechanism;

instruct the multi-axis robotic arm to form a wired connection between the first electronic device and the second electronic device; and instruct the multi-axis robotic arm to place the second electronic device in the predetermined location of the object such that the wired connection is maintained.

16. The autonomous fabrication system according to claim 15, wherein the wired connection between the first electronic device and the second electronic device is formed by:

orienting, by the multi-axis robotic arm, the second electronic device positioned proximate to a first connector of the first electronic device, the second electronic device comprising a second connector, the first connector being coupled to a wire;

positioning, by the multi-axis robotic arm, a second prefabricated part proximate to the first connector of the first electronic device such that the first connector and the second connector are coupled to one another through the wire; and repositioning, by the multi-axis robotic arm, the second electronic device in the predetermined location of the object such that the wired connection is maintained.

17. The autonomous fabrication system according to claim 10, wherein:

the processing circuitry comprises a host client, a first controller configured to control the multi-axis robotic arm, a second controller configured to control an actuator configured to apply lateral force to the object as fabricated, and a third controller configured to control the AM toolhead and the component gripping mechanism of the end effector; and the first controller, the second controller, and the third controller are configured to subscribe to the host client through an instruction messaging service, wherein corresponding instructions accessed by the host client are pulled from the instruction messaging service by the first controller, the second controller, and the third controller.

18. The autonomous fabrication system according to claim 10, wherein the multi-axis robotic arm has six degrees-of-freedom (6-DoF).

\* \* \* \* \*